United States Patent
Jansen et al.

(10) Patent No.: US 9,217,109 B2
(45) Date of Patent: Dec. 22, 2015

(54) POLYMER-STABILISED LIQUID-CRYSTAL MEDIA AND DISPLAYS

(75) Inventors: Axel Jansen, Darmstadt (DE); Thorsten Kodek, Trebur (DE); Helmut Haensel, Muehltal (DE); Erdal Durmaz, Darmstadt (DE); Julia Sprang, Weilrod (DE)

(73) Assignee: MERCK PATENT GmbH, Darmstadt (DE)

(*) Notice: Subject to any disclaimer, the term of this patent is extended or adjusted under 35 U.S.C. 154(b) by 132 days.

(21) Appl. No.: 13/810,603

(22) PCT Filed: Jun. 29, 2011

(86) PCT No.: PCT/EP2011/003199
§ 371 (c)(1),
(2), (4) Date: Jan. 16, 2013

(87) PCT Pub. No.: WO2012/022388
PCT Pub. Date: Feb. 23, 2012

(65) Prior Publication Data
US 2013/0119311 A1    May 16, 2013

(30) Foreign Application Priority Data

Jul. 22, 2010 (DE) .................. 10 2010 031 913

(51) Int. Cl.
| | | |
|---|---|---|
| C09K 19/52 | (2006.01) | |
| C09K 19/54 | (2006.01) | |
| C09K 19/34 | (2006.01) | |
| C09K 19/30 | (2006.01) | |
| C09K 19/20 | (2006.01) | |
| C09K 19/06 | (2006.01) | |
| C09K 19/02 | (2006.01) | |
| C09K 19/04 | (2006.01) | |
| C09K 19/46 | (2006.01) | |
| C09K 19/38 | (2006.01) | |

(52) U.S. Cl.
CPC ........... *C09K 19/062* (2013.01); *C09K 19/0275* (2013.01); *C09K 19/04* (2013.01); *C09K 19/063* (2013.01); *C09K 19/066* (2013.01); *C09K 19/068* (2013.01); *C09K 19/3402* (2013.01); *C09K 19/3809* (2013.01); *C09K 19/46* (2013.01); *C09K 19/3441* (2013.01); *C09K 19/3444* (2013.01); *C09K 19/3458* (2013.01); *C09K 2019/0448* (2013.01); *C09K 2019/0466* (2013.01); *C09K 2019/2042* (2013.01); *C09K 2019/548* (2013.01)

(58) Field of Classification Search
CPC ............. C09K 19/0275; C09K 19/062; C09K 19/063; C09K 19/066; C09K 19/3809; C09K 2019/0448; C09K 2019/0466; C09K 2019/548; C09K 19/3402; C09K 19/3441; C09K 19/3444; C09K 19/345; C09K 19/3458
USPC ............ 252/299.01, 299.61, 299.62, 299.63; 560/127, 144
See application file for complete search history.

(56) References Cited

U.S. PATENT DOCUMENTS

| | | | |
|---|---|---|---|
| 4,792,517 A | 12/1988 | Klein et al. | |
| 8,304,035 B2 | 11/2012 | Bernatz et al. | |
| 8,313,669 B2 | 11/2012 | Bernatz et al. | |
| 2008/0081133 A1* | 4/2008 | Kato | 428/1.1 |
| 2009/0323012 A1* | 12/2009 | He et al. | 349/182 |
| 2010/0103366 A1 | 4/2010 | Farrand et al. | |
| 2010/0272925 A1 | 10/2010 | Goetz et al. | |
| 2010/0309423 A1 | 12/2010 | Bernatz et al. | |
| 2011/0101269 A1 | 5/2011 | Bernatz et al. | |
| 2011/0261311 A1 | 10/2011 | Jansen et al. | |
| 2013/0277609 A1* | 10/2013 | Goto et al. | 252/299.61 |
| 2015/0102259 A1* | 4/2015 | Gotoh et al. | 252/299.4 |

FOREIGN PATENT DOCUMENTS

| | | | |
|---|---|---|---|
| CN | 101008784 A | * | 8/2007 |
| DE | 10 2008 035889 | | 3/2009 |
| DE | 10-2008 036248 | | 3/2009 |
| EP | 0 212 271 | | 3/1987 |
| EP | 2 243 812 | | 10/2010 |
| EP | 2 380 945 | | 10/2011 |
| WO | WO-2008 061606 | | 5/2008 |

OTHER PUBLICATIONS

English translation generated by machine for CN101008784, 2007.*
International Search Report for PCT/EP2011/003199, Date of the actual completion of the international search: Nov. 4, 2011, Date of mailing of the International Search Report: Nov. 11, 2011.
Kong, X. et al., "Synthesis and liquid crystal properties of triphenylene liquid crystals bearing polymerisable acrylate and methacrylate groups," Liquid Crystals, Aug. 2011, vol. 38, No. 8, pp. 943-955.

* cited by examiner

*Primary Examiner* — Shean C Wu
(74) *Attorney, Agent, or Firm* — John Sopp; Anthony Zelano; Brion Heaney

(57) ABSTRACT

The present invention relates to liquid-crystalline media and display devices comprising polymerizable compounds, to the use of the polymerizable compounds for optical, electro-optical and electronic purposes, in particular in liquid-crystal (LC) media and LC displays having a polymer-stabilized blue phase, and in LC media for LC displays of the PS or PSA ("polymer sustained" or "polymer sustained alignment") type. The polymerizable compounds comprise a ring system which is functionalized by three or more polymerizable groups, each connected via an optional spacer group.

12 Claims, No Drawings

POLYMER-STABILISED LIQUID-CRYSTAL MEDIA AND DISPLAYS

The present invention relates to liquid-crystalline media and display devices comprising polymerisable compounds, to he use of the polymerisable compounds for optical, electro-optical and electronic purposes, in particular in liquid-crystal (LC) media and LC displays having a polymer-stabilised blue phase, and in LC media for LC displays of the PS or PSA ("polymer sustained" or "polymer sustained alignment") type. The polymerisable compounds comprise a ring system which is functionalised by three or more polymerisable groups, each connected via an optional spacer group.

Media for display elements which operate in the liquid-crystalline blue phase (blue phase for short) are known from the prior art. Such displays are described, for example, in WO 2004/046805 A1 and WO 2008/061606 A1.

The blue phase is generally observed at the transition from the nematic state to the optically isotropic state. The medium in the liquid-crystalline blue phase may be blue, as the name suggests, but also colourless. The aim of efforts to date was to extend the temperature range of the blue phase from less than one degree to a range which is useful in practice (cf. H. Kikuchi et al., *Nature Materials* (2002), 1(1), 64-68; Kikuchi, H. et al., *Polymeric Materials Science and Engineering*, (2003), 89, 90-91).

For this purpose, it has been proposed in the prior art to add a polymerisable compound to the LC medium, and then to polymerise this compound in situ in the LC medium. The polymer or polymer network formed in the process is claimed to stabilise the blue phase.

The polymer-stabilised blue phases described to date in the prior art use, for example, a monoreactive non-mesogenic monomer together with a direactive mesogenic monomer as monomers.

WO 2005/080529 A1 describes polymer-stabilised blue phases comprising mono- and multireactive monomers.

The present invention was based on the object of finding suitable monomers and corresponding polymers for the stabilisation of blue phases. The polymer is intended, in particular, to have the following effects on the properties of the stabilised LC phase:
broad temperature range of the blue phase,
fast response time,
low operating voltage ($V_{op}$),
small variation of the operating voltage with temperature,
low hysteresis of the transmission of a cell when the operating voltage is changed in order to achieve defined grey shades.

In addition, monomer materials which have a good "voltage holding ratio" (VHR), have high clearing points, and are stable to exposure to light and temperature are required. Good solubility in LC materials or good miscibility with the LC medium is furthermore necessary in order to achieve a good distribution in the LC medium.

The present invention is thus based on the object of providing improved polymerisable compounds, and LC media comprising such compounds, in particular for use in LC displays having a polymer-stabilised blue phase. The polymerisable compounds according to the invention are intended to stabilise the blue phase. The LC media according to the invention are intended to have one or more improved properties, in particular selected from the properties mentioned above. In particular, the LC media are intended to have a broad blue phase, enable fast switching, have a good voltage holding ratio (VHR), require low voltages ($V_{op}$) for the switching process and exhibit low hysteresis ($\Delta V$) and have a low memory effect (ME). The LC media are intended to be stable to exposure to light and temperature.

Furthermore, so-called PS and PSA ("polymer sustained" and "polymer sustained alignment" respectively) displays, for which the term "polymer stabilised" is also occasionally used, are known from the prior art. In these displays, a small amount (for example 0.3% by weight, typically <1% by weight) of one or more polymerisable compound(s) is added to the LC medium and, after introduction into the LC cell, is polymerised or cross-linked in situ, usually by UV photopolymerisation, with or without an applied electrical voltage between the electrodes. The addition of polymerisable mesogenic or liquid-crystalline compounds, also known as reactive mesogens or "RMs", to the LC mixture has proven particularly suitable.

The term "PSA" is used below, unless indicated otherwise, as representative of PS displays and PSA displays.

In the meantime, the PS(A) principle is being used in diverse classical LC displays. Thus, for example, PSA-VA, PSA-OCB, PSA-IPS, PSA-FFS and PSA-TN displays are known. The polymerisation of the polymerisable compound(s) is preferably carried out with an applied electrical voltage in the case of PSA-VA and PSA-OCB displays and with or without an applied electrical voltage in the case of PSA-IPS displays. As can be shown in test cells, the PS(A) method results in a 'pretilt' in the cell. In the case of PSA-OCB displays, for example, the bend structure can be stabilised, so that an offset voltage is unnecessary or can be reduced. In the case of PSA-VA displays, the pretilt has a positive effect on the response times. For PSA-VA displays, a standard MVA or PVA pixel and electrode layout can be used. In addition, however, only one structured electrode side and no protrusions, for example, are also sufficient, which significantly simplifies production and at the same time results in very good contrast at the same time as very good light transmission.

PSA-VA displays are described, for example, in JP 10-036847 A, EP 1 170 626 A2, U.S. Pat. No. 6,861,107, U.S. Pat. No. 7,169,449, US 2004/0191428 A1, US 2006/0066793 A1 and US 2006/0103804 A1. PSA-OCB displays are described, for example, in T.-J-Chen et al., Jpn. J. Appl. Phys. 45, 2006, 2702-2704 and S. H. Kim, L.-C-Chien, Jpn. J. Appl. Phys. 43, 2004, 7643-7647. PSA-IPS displays are described, for example, in U.S. Pat. No. 6,177,972 and Appl. Phys. Lett. 1999, 75(21), 3264. PSA-TN displays are described, for example, in Optics Express 2004, 12(7), 1221.

PSA displays, like the conventional LC displays described above, can be operated as active-matrix or passive-matrix displays. In the case of active-matrix displays, individual pixels are usually addressed by integrated, non-linear, active elements, such as, for example, transistors (for example thin-film transistors or "TFTs"), while in the case of passive-matrix displays, the addressing is usually carried out by the multiplex method, both methods being known from the prior art.

However, not all combinations consisting of LC mixture and polymerisable component are suitable for PSA displays, since, for example, an inadequate tilt, or none at all, is established or since, for example, the so-called "voltage holding ratio" (VHR or HR) is inadequate for TFT display applications. In addition, it has been found that the LC mixtures and RMs known from the prior art still have some disadvantages on use in PSA displays. Thus, not every known RM which is soluble in LC mixtures is suitable for use in PSA displays.

In addition, the selected combination of LC host mixture/ RM should have the lowest possible rotational viscosity and the best possible electrical properties. In particular, it should have the highest possible VHR. In PSA displays, a high VHR after irradiation with UV light is particularly necessary since UV exposure is a necessary part of the display production process, but also occurs as normal exposure during operation of the finished display.

In particular, it would be desirable to have available novel materials for PSA displays which generate a particularly low pretilt angle. Preference is given here to materials which generate a lower pretilt angle during polymerisation for the same exposure time than the materials known to date, and/or whose use enables the (higher) pretilt angle that can be achieved with the known materials to be achieved already after a shorter exposure time. It was thus possible for the production time ("tact time") of the display to be shortened and for the costs of the production process to be reduced.

A further problem in the production of PSA displays is the presence or removal of residual amounts of unpolymerised RMs, in particular after the polymerisation step for generation of the pretilt angle in the display. For example, unreacted RMs of this type may adversely affect the properties of the display by polymerising in an uncontrolled manner, for example during operation after completion of the display.

Thus, the PSA displays known from the prior art often exhibit the undesired effect of so-called "image sticking" or "image burn", i.e. the image produced in the LC display by temporary addressing of individual pixels still remains visible even after the electric field in these pixels has been switched off, or after other pixels have been addressed.

It is therefore desirable for the polymerisation of the RMs during production of the PSA display to proceed as completely as possible and for the presence of unpolymerised RMs in the display to be excluded as far as possible or reduced to a minimum. To this end, materials which enable the most effective and complete polymerisation possible are required.

There is thus still a great demand for PSA displays and LC media and polymerisable compounds for use in such displays, which do not exhibit the disadvantages described above or only do so to a small extent and have improved properties. In addition, there is a great demand for PSA displays, and materials for use in PSA displays, which have advantageous properties, in particular facilitate a high specific resistance at the same time as a large working-temperature range, short response times, even at low temperatures, and a low threshold voltage, a low pretilt angle, a multiplicity of grey shades, high contrast and a broad viewing angle, and high values of the voltage holding ratio (VHR) after UV exposure and low-temperature stability, also known as LTS, i.e. the stability of the LC mixture to individual components spontaneously crystallising out.

The invention is based on the object of achieving improved polymer-stabilised LC displays. The invention is thus based on the further object of providing novel suitable materials, in particular RMs and LC media comprising the latter, for use in PSA displays which do not have the disadvantages indicated above, or only do so to a reduced extent, polymerise as quickly and completely as possible, enable a low pretilt angle to be established as quickly as possible, reduce or prevent the occurrence of image sticking in the display, and preferably at the same time enable very high specific resistance values, low threshold voltages and short response times. In addition, the LC media should have favourable LC phase properties and high VHR and LTS values.

The objects described above have been achieved in accordance with the invention by the provision of materials, processes and LC displays as described in the present application. In particular, it has been found, surprisingly, that the objects described above can be achieved in part or full by using LC media which comprise one or more polymerisable compounds according to the invention, as described above, for the production of such LC displays or by providing LC displays having a blue phase or PSA displays which contain one or more compounds according to the invention in polymerised form.

The polymerisable compounds according to the invention which are used and, if novel, have been found contain a central ring or ring system and at least three polymerisable groups which are linked to the ring (system) directly or via spacer groups.

The use of the polymerisable compounds according to the invention in LC media according to the invention for LC displays having a polymer-stabilised blue phase results in significant stabilisation of the blue phase. In addition, it has been found, surprisingly, that a significant reduction in hysteresis ($\Delta V_{50}$) and an increase in contrast are achieved on use of the polymerisable compounds according to the invention in LC media having a polymer-stabilised blue phase, compared with polymerisable compounds and LC media as described in the prior art.

In PSA displays, the use of the polymerisable compounds according to the invention in LC media according to the invention results in the desired pretilt being achieved particularly quickly and in significantly shortened times in production of the display.

Numerous compounds which consist of a carbocyclic ring with one or two attached polymerisable groups are known from the prior art. Compounds based on cyclohexane rings are described in WO 2008/061606 and U.S. Pat. No. 4,767,883. Compounds of this type are also employed in liquid-crystalline mixtures, for example for the production of films having particular optical properties.

Also known are cyclic compounds containing three or more reactive groups, for example in EP 212271. Furthermore, benzene derivatives containing three reactive acrylate groups are disclosed in the specifications U.S. Pat. No. 4,792,517 and US 2008/081133 and CN 101008784.

However, the use in LC media having a blue phase or in displays of the PS/PSA type is not disclosed in nor is obvious from any of these specifications.

Thus, polymer-stabilised blue phases for LC media comprising a reactive component, which preferably consists of polymerisable compounds according to the invention, are neither described in nor are obvious from the prior art.

The present invention relates to liquid-crystalline media which comprise a polymer which includes at least one polymerised monomer component of the formula I, as below and in the Claims, and optionally further polymerised monomers, or which comprise at least one unpolymerised monomer of the formula I, or both.

The invention furthermore relates to the use of compounds of the formula I

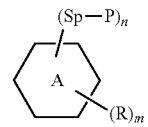

I in which
R denotes
a) in each case, independently of one another, a halogenated or unsubstituted alkyl radical having 1 to 15 C atoms, where, in addition, one or more CH$_2$ groups in these radicals may each be replaced, independently of one another, by —C≡C—, —CH=CH—, —(CO)O—, —O(CO)—, —(CO)— or —O— in such a way that O atoms are not linked directly to one another,
b) a group -Sp-P, or
c) F, Cl, H, Br, CN, SCN, NCS or $SF_5$, preferably a group in accordance with a) or b), A denotes
a) cyclohexane or cyclohexene,
b) benzene, in which one or two CH groups may be replaced by N,
or
c) a radical from the group bicyclo[1.1.1]pentane, bicyclo[2.2.2]-octane, spiro[3.3]heptane, dioxane, selenophene, thiophene, furan, naphthalene, anthracene, phenanthrene, chroman, adamantane,

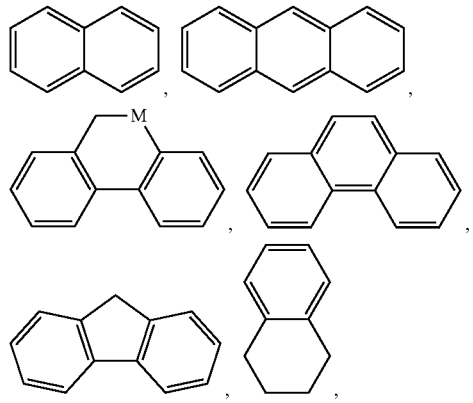

in which
one or more double bonds may be replaced by single bonds,
one or more CH groups may be replaced by N,
M denotes —O—, —S—, —$CH_2$—, —CHY— or —$CYY^1$—, and
Y and $Y^1$ denote Cl, F, CN, $OCF_3$ or $CF_3$,
m denotes 0, 1, 2 or 3, for polycyclic rings A also more, preferably 0, 1, 2 or 3, particularly preferably 0,
n denotes 3, 4 or more, preferably 3 or 4, particularly preferably 3,
P denotes a polymerisable group,
Sp denotes a spacer group or a single bond, preferably a spacer group,
or of a polymer obtainable by polymerisation of one or more compounds of the formula I, in electro-optical devices, preferably in LC displays having a blue phase or in LC displays of the PS or PSA type.

The polymer of the medium and of the display may be formed exclusively from monomers of the formula I or may be a copolymer with other polymers.

All ring systems A indicated may be substituted at any desired position by the groups R and -Sp-P instead of a hydrogen atom.

The number of polymerisable groups P according to formula I is three or more.

The invention furthermore relates to the use of LC media comprising one or more compounds of the formula I in electro-optical devices, preferably in LC displays having a blue phase or in LC displays of the PS or PSA type.

The invention furthermore relates to a process for the preparation of an LC medium as described above and below in which one or more low-molecular-weight liquid-crystalline compounds, or an LC host mixture as described above and below, are mixed with one or more compounds of the formula I and optionally with further liquid-crystalline compounds and/or additives and optionally polymerised.

The invention furthermore relates to the use of compounds of the formula I and LC media according to the invention comprising them in LC displays for stabilisation of the blue phase, in particular over the greatest possible temperature range, preferably by polymerising the compounds of the formula I in the LC display.

The invention furthermore relates to the use of compounds of the formula I and LC media according to the invention comprising them in PS and PSA displays for the generation of a tilt angle in the LC medium by in-situ polymerisation of the compound(s) of the formula I in the PSA display, preferably with application of an electric or magnetic field.

The invention furthermore relates to an LC display containing one or more compounds of the formula I, a polymer obtainable by polymerisation of one or more compounds of the formula I or an LC medium according to the invention, in particular a PS or PSA display, particularly preferably a display having a blue phase, a PSA-VA, PSA-OCB, PSA-IPS, PSA-FFS or PSA-TN display.

The invention furthermore relates to an LC display of the PS or PSA type containing an LC cell having two substrates and two electrodes, where at least one substrate is transparent to light and at least one substrate has one or two electrodes, and a layer, located between the substrates, of an LC medium comprising a polymerised component and a low-molecular-weight component, where the polymerised component is obtainable by polymerisation of one or more polymerisable compounds between the substrates of the LC cell in the LC medium, preferably with application of an electrical voltage to the electrodes, characterised in that at least one of the polymerisable compounds is selected from formula I.

The invention furthermore relates to a process for the production of an LC display as described above and below in which an LC medium comprising one or more low-molecular-weight liquid-crystalline compounds or an LC host mixture as described above and below and one or more polymerisable compounds, at least one of which is selected from formula I, is introduced into an LC cell having two substrates and two electrodes as described above and below, and the polymerisable compounds are polymerised, preferably with application of an electrical voltage to the electrodes.

The PS and PSA displays according to the invention have two electrodes, preferably in the form of transparent layers, which are applied to one or both of the substrates which form the LC cell. Either in each case one electrode is applied to each of the two substrates, as, for example, in PSA-VA, PSA-OCB or PSA-TN displays according to the invention, or both electrodes are applied to only one of the two substrates, while the other substrate has no electrode, as, for example, in PSA-IPS or PSA-FFS displays according to the invention.

The invention furthermore relates to compounds of the formula I which are not already known from the prior art.

The ring

preferably denotes a group selected from

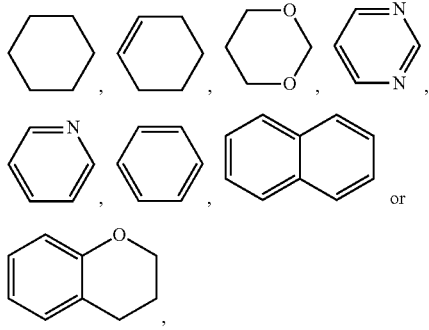

particularly preferably selected from

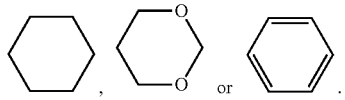

The groups R preferably denote, independently of one another, halogen or branched alkyl, alkenyl, alkoxy having 1 to 12 C atoms, particularly preferably fluorine or straight-chain alkyl or alkoxy having 1 to 12 C atoms, particularly preferably having 1 to 5 C atoms. R is very particularly preferably fluorine, methyl or ethyl.

The number of units P-Sp attached to a ring A depends on the number of carbon atoms in the ring. Each CH unit may be replaced by C—P-Sp, and each $CH_2$ unit may be replaced by CH-Sp-P or C(Sp-P)$_2$, where CH-Sp-P is preferred. For the particularly preferred embodiments with one ring A equal to a cyclohexane radical, n can thus adopt values from 3 to 12. n is preferably 3-6, particularly preferably 3 or 4. n is very particularly preferably equal to 3. For the particularly preferred embodiments with one ring A equal to a benzene radical, n can thus adopt values from 3 to 6. n is particularly preferably equal to 3 or 4. n is very particularly preferably equal to 3.

The polymerisable group P is a group which is suitable for a polymerisation reaction, such as, for example, free-radical or ionic chain polymerisation, polyaddition or polycondensation, or for a polymer-analogous reaction, for example addition or condensation onto a main polymer chain. Particular preference is given to groups for chain polymerisation, in particular those containing a C═C double bond or —C≡C— triple bond, and groups which are suitable for polymerisation with ring opening, such as, for example, oxetane or epoxide groups.

Preferred groups P are selected from $CH_2$═$CW^1$—CO—O—, $CH_2$═$CW^1$—CO—,

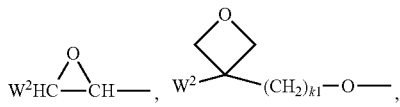

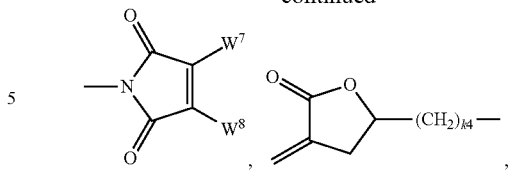

$CH_2$═$CW^2$—(O)$_{k3}$—, $CW^1$═CH—CO—(O)$_{k3}$—, $CW^1$═CH—CO—NH—, $CH_2$═$CW^1$—CO—NH—, $CH_3$—CH═CH—O—, ($CH_2$═CH)$_2$CH—OCO—, ($CH_2$═CH—$CH_2$)$_2$CH—OCO—, ($CH_2$═CH)$_2$CH—O—, ($CH_2$═CH—$CH_2$)$_2$N—, ($CH_2$═CH—$CH_2$)$_2$N—CO—, HO—$CW^2W^3$—, HS—$CW^2W^3$—, $HW^2$N—, HO—$CW^2W^3$—NH—, $CH_2$═$CW^1$—CO—NH—, $CH_2$═CH—(COO)$_{k1}$-Phe-(O)$_{k2}$—, $CH_2$═CH—(CO)$_{k1}$-Phe-(O)$_{k2}$—, Phe-CH═CH—, HOOC—, OCN— and $W^4W^5W^6$Si—, in which $W^1$ denotes H, F, Cl, CN, $CF_3$, phenyl or alkyl having 1 to 5 C atoms, in particular H, F, Cl or $CH_3$, $W^2$ and $W^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and $W^8$ each, independently of one another, denote H, Cl or alkyl having 1 to 5 C atoms, Phe denotes 1,4-phenylene, which is optionally substituted by one or more radicals L as defined above which are other than P-Sp-, $k_1$, $k_2$ and $k_3$ each, independently of one another, denote 0 or 1, $k_3$ preferably denotes 1, and $k_4$ denotes an integer from 1 to 10.

Particularly preferred groups P are $CH_2$═$CW^1$—COO—, in particular $CH_2$═CH—COO—, $CH_2$═C($CH_3$)—COO— and $CH_2$═CF—COO—, furthermore $CH_2$═CH—O—, ($CH_2$═CH)$_2$CH—OCO—, ($CH_2$═CH)$_2$CH—O—,

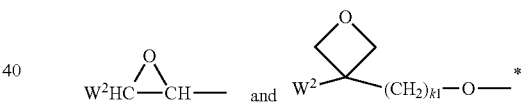

Very particularly preferred groups P are vinyloxy, acrylate, methacrylate, fluoroacrylate, chloroacrylate, oxetane and epoxy, in particular acrylate and methacrylate.

The monomers according to the invention are suitable for the formation of polymers having a varying degree of crosslinking, depending on the number of polymerisable groups per molecule. If they contain only one polymerisable group, they form polymer chains. They preferably contain at least in some cases two or more polymerisable groups and serve as crosslinking agents. The compounds of the formula I preferably contain 3, 4 or 5 polymerisable groups. They particularly preferably contain 3 or 4 polymerisable groups.

The term "spacer group" (or "spacer"), also denoted by "Sp" above and below, is known to the person skilled in the art and is described in the literature, see, for example, *Pure Appl. Chem.* 73(5), 888 (2001) and C. Tschierske, G. Pelzl, S. Diele, *Angew. Chem.* 2004, 116, 6340-6368. Unless indicated otherwise, the term "spacer group" or "spacer" above and below denotes a flexible group which connects the mesogenic group and the polymerisable group(s) in a polymerisable liquid-crystalline or mesogenic compound to one another.

Preferred spacer groups $Sp^{a,b}$ are selected from the formula Sp"-X", so that the radical $P^{a/b}$-$Sp^{a/b}$- conforms to the formula $P^{a/b}$-Sp"-X"—, where Sp' denotes alkylene having 1 to 24, preferably 1 to 12, C atoms, which is optionally mono- or polysubstituted by F, Cl, Br, I or CN and in which, in addition, one or more non-adjacent CH$_2$ groups may each be replaced, independently of one another, by —O—, —S—, —NH—, —NR$^0$—, —SiR$^{00}$R$^{000}$—, —CO—, —COO—, —OCO—, —OCO—O—, —S—CO—, —CO—S—, —NR$^{00}$—CO—O—, —O—CO—NR$^{00}$—, —NR$^{00}$—CO—NR$^{00}$—, —CH=CH— or —C≡C— in such a way that O and/or S atoms are not linked directly to one another, X denotes —O—, —S—, —CO—, —COO—, —OCO—, —O—COO—, —CO—NR$^{00}$—, —NR$^{00}$—CO—, —NR$^{00}$—CO—NR$^{00}$—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH=N—, —N=CH—, —N=N—, —CH=CR$^0$—, —CY$^2$=CY$^3$—, —C≡C—, —CH=CH—COO—, —OCO—CH=CH— or a single bond, preferably a single bond, —O—, —COO— or —OCH$_2$—, R$^{00}$ and R$^{000}$ each, independently of one another, denote H or alkyl having 1 to 12 C atoms, and Y$^2$ and Y$^3$ each, independently of one another, denote H, F, Cl or CN.

X is preferably —O—, —S—CO—, —COO—, —OCO—, —O—COO—, —CO—NR$^0$—, —NR$^0$—CO—, —NR$^0$—CO—NR$^0$— or a single bond.

Typical spacer groups Sp' are, for example, —(CH$_2$)$_{p1}$—, —(CH$_2$CH$_2$O)$_{p2}$—, —CH$_2$CH$_2$—, —CH$_2$CH$_2$—S—CH$_2$CH$_2$—, —CH$_2$CH$_2$—NH—CH$_2$CH$_2$— or —(SiR$^{00}$R$^{000}$—O)$_{p1}$—, in which p1 is an integer from 1 to 24, p2 is an integer from 1 to 6, and R$^{00}$ and R$^{000}$ have the meanings indicated above.

Particularly preferred groups —X-Sp'- are —(CH$_2$)$_{p1}$—, —O—(CH$_2$)$_{p1}$—, —OCO—(CH$_2$)$_{p1}$—, —OCOO—(CH$_2$)$_{p1}$, in which p1 and q1 have the meanings indicated above.

Particularly preferred groups Sp' are, for example, in each case straight-chain ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methyliminoethylene, 1-methylalkylene, ethenylene, propenylene and butenylene.

The compounds according to the invention are highly suitable as polymerisable components in liquid-crystalline media. The polymer meets the requirements set out in the object of the stabilisation of liquid-crystalline phases, in particular of blue phases, in every respect. Compared with conventional systems, a significant reduction in the operating voltages is observed. At the same time, the tendency towards the formation of hystereses in the transmission (grey values) is reduced depending on the (rising or falling) operating voltage. In addition, they can in many cases be prepared in a simple manner from commercial starting compounds.

Particularly preferred compounds of the formula I are derived from starting materials containing hydroxyl groups or carboxyl functions. These compounds are particularly suitable for subsequent functionalisation. In the simplest case, three or more of these groups are bonded directly to the ring A.

Here and below, a planar notation is selected. However, all possible stereoisomers (enantiomers and diastereomers) which arise through the position of the substituents on the ring are also preferred for the purposes of the present invention. These can be in stereoisomerically pure form or in the form of mixtures of stereoisomers.

Particularly preferred compounds according to the invention are derived, for example, from:

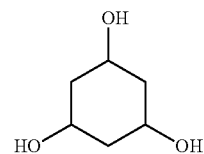

1,3,5-cyclohexane-triol

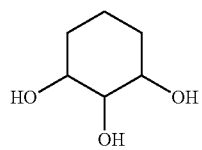

1,2,3-cyclohexanetriol

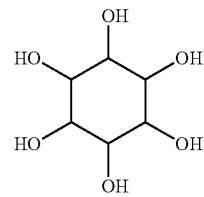

sorbitols, in particular inositol (see below)

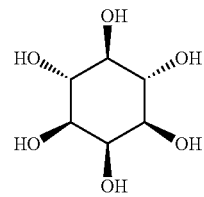

inositol

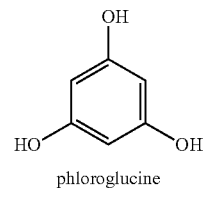

phloroglucine

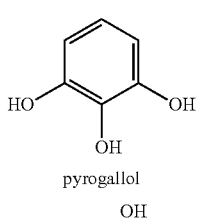

pyrogallol

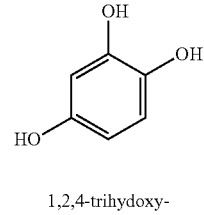

1,2,4-trihydroxy-benzene

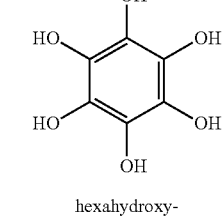

hexahydroxy-benzene

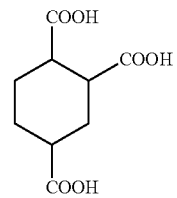

1,2,5-cyclohexane-tricarboxylic acid

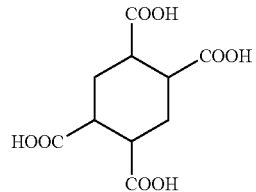

1,2,4,5-cyclohexane-tetra-carboxylic acid

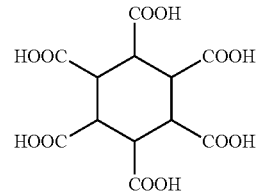

1,2,3,4,5,6-cyclo-hexane-hexacarboxylic acid

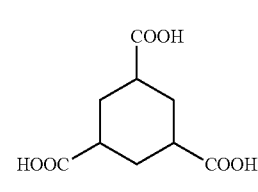

1,3,5-cyclohexane-tricarboxylic acid

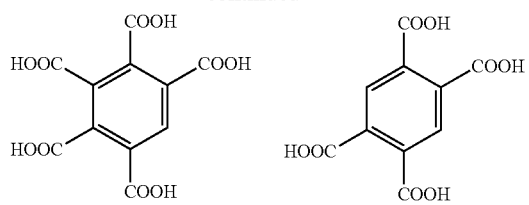

1,2,3,4,5-benzene-pentacarboxylic acid 1,2,3,4,5-benzene-tetracarboxylic acid

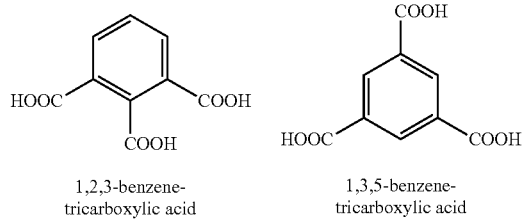

1,2,3-benzene-tricarboxylic acid 1,3,5-benzene-tricarboxylic acid

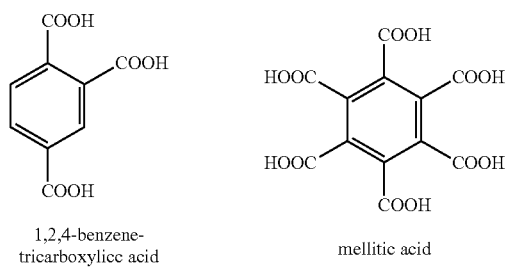

1,2,4-benzene-tricarboxylicc acid mellitic acid

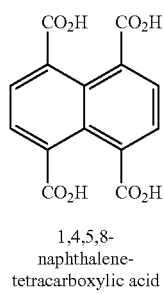

1,4,5,8-naphthalene-tetracarboxylic acid

Furthermore, hydroxyl or acid functions may also be bonded to the ring indirectly, via spacers (for example methylene). Preferred compounds according to the invention are derived, for example, from:

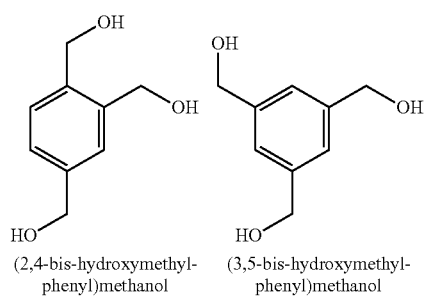

(2,4-bis-hydroxymethyl-phenyl)methanol (3,5-bis-hydroxymethyl-phenyl)methanol

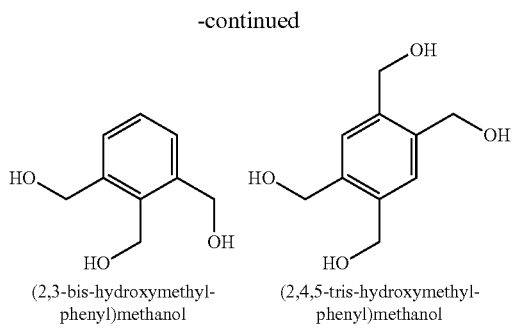

(2,3-bis-hydroxymethyl-phenyl)methanol (2,4,5-tris-hydroxymethyl-phenyl)methanol

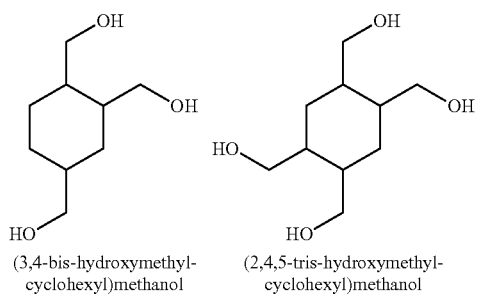

(3,4-bis-hydroxymethyl-cyclohexyl)methanol (2,4,5-tris-hydroxymethyl-cyclohexyl)methanol

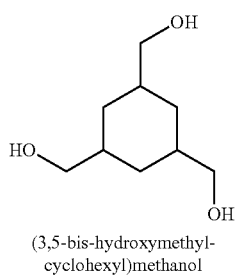

(3,5-bis-hydroxymethyl-cyclohexyl)methanol

The attachment of the groups which are preferred for further functionalisation may, as above, be uniform or starting materials containing different hydroxyl or acid functions may be employed for the synthesis of the compounds I. Furthermore, further substituents may be attached. Compounds according to the invention are derived, for example, from:

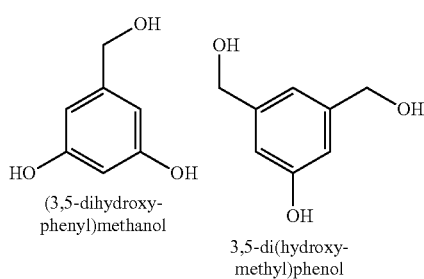

(3,5-dihydroxy-phenyl)methanol 3,5-di(hydroxy-methyl)phenol

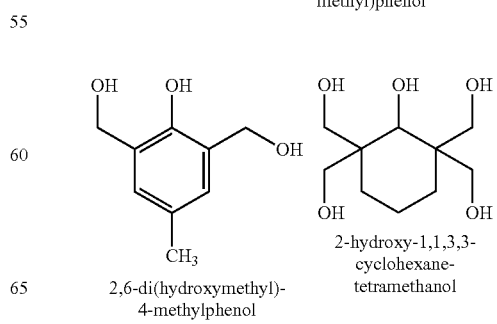

2,6-di(hydroxymethyl)-4-methylphenol 2-hydroxy-1,1,3,3-cyclohexane-tetramethanol

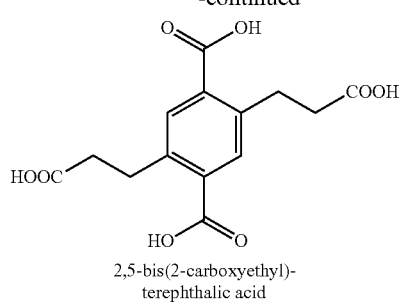

2,5-bis(2-carboxyethyl)-
terephthalic acid

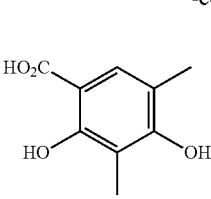

3,6-dimethyl-2,4-
dihydroxybenzoic
acid

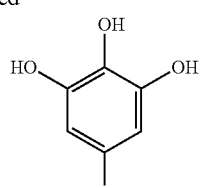

gallic acid

Furthermore, starting materials which contain both hydroxyl and carboxyl or also carboxylate functions are also preferred. Esters can easily be hydrolysed to the corresponding carboxylic acids, optionally not until during the remainder of the synthesis. Compounds according to the invention are derived, for example, from:

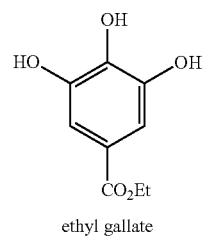

ethyl gallate

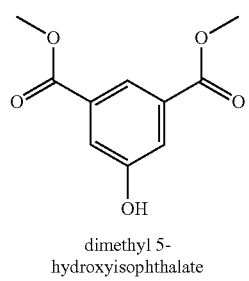

dimethyl 5-
hydroxyisophthalate

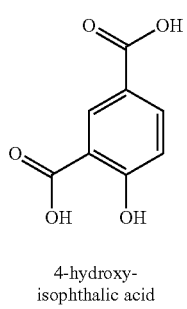

4-hydroxy-
isophthalic acid

Preference is likewise also given to compounds having branched chains which contain a plurality of functional groups. These are, for example, compounds of the malonate type. Compounds according to the invention are derived, for example, from:

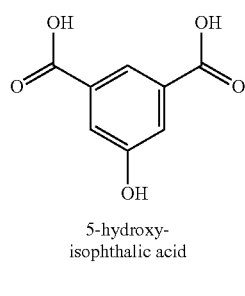

5-hydroxy-
isophthalic acid

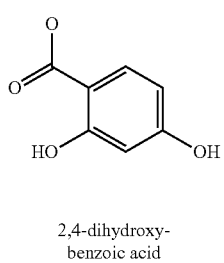

2,4-dihydroxy-
benzoic acid

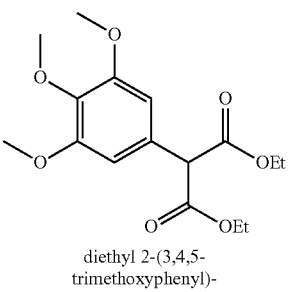

diethyl 2-(3,4,5-
trimethoxyphenyl)-
malonate

The methyl ether groups here can be cleaved to give hydroxyl groups in the course of the synthesis.

Preference is likewise given to materials which contain further groups which are suitable for functionalisation, for example aldehyde functions or halogen. Compounds according to the invention are derived, for example, from:

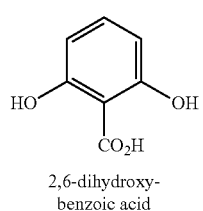

2,6-dihydroxy-
benzoic acid

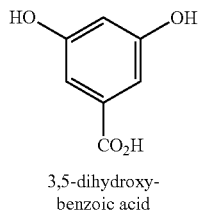

3,5-dihydroxy-
benzoic acid

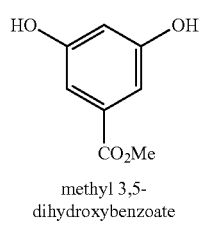

methyl 3,5-
dihydroxybenzoate

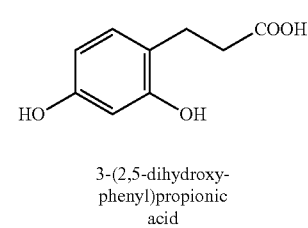

3-(2,5-dihydroxy-
phenyl)propionic
acid

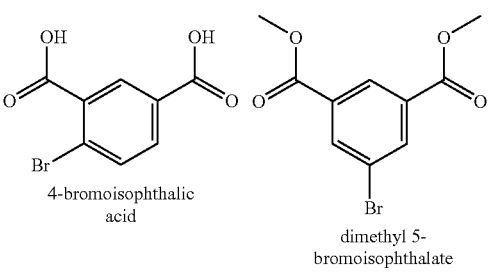

4-bromoisophthalic
acid dimethyl 5-
bromoisophthalate

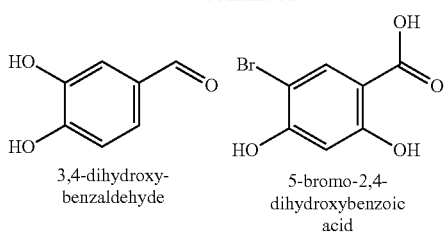

3,4-dihydroxy-benzaldehyde 5-bromo-2,4-dihydroxybenzoic acid

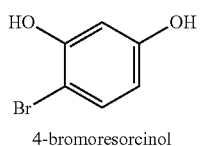

4-bromoresorcinol

Aryl bromides and aryl halides are particularly preferably also preferred starting materials for the synthesis of the compounds I. Compounds according to the invention are derived, for example, from:

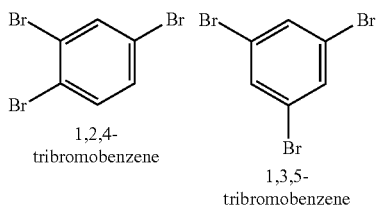

1,2,4-tribromobenzene 1,3,5-tribromobenzene

Particularly preferred structures I are shown below in subformulae IA-1 to IA-9, where a planar notation is selected. However, all possible stereoisomers (enantiomers and diastereomers) which arise through the position of the substituents on the ring are preferred for the purposes of the present invention. These can be in stereoisomerically pure form or in the form of mixtures of stereoisomers.

$Sp^{1-6}$, $P^{1-6}$ and $R^{1-6}$ adopt the meanings indicated for Sp, P and R, and the preferred meanings in each case. $Sp^{1-6}$, $P^{1-6}$ and $R^{1-6}$ may in each case be identical to or different from one another. $P^{1-6}$ particularly preferably denote acrylate or methacrylate. $R^{1-6}$ preferably denote hydrogen, halogen, straight-chain or branched alkyl, alkenyl, alkoxy having 1 to 12 C atoms. $R^{1-6}$ particularly preferably denote straight-chain hydrogen, fluorine, alkyl or alkoxy having 1 to 5 C atoms. $R^{1-6}$ very particularly preferably denote hydrogen, fluorine or methyl, amongst which again preferably hydrogen.

IA-1

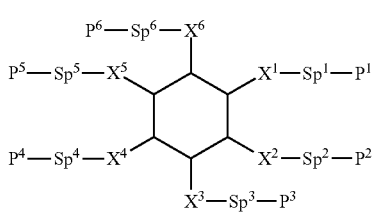

IA-2

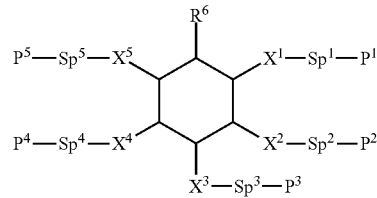

IA-3

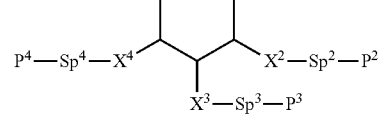

IA-4

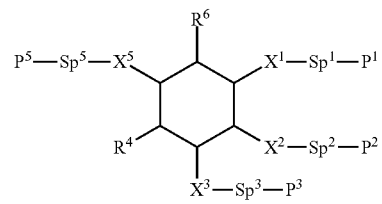

IA-5

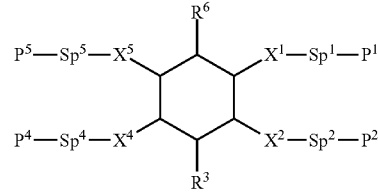

IA-6

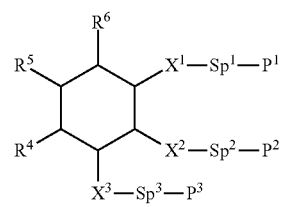

IA-7

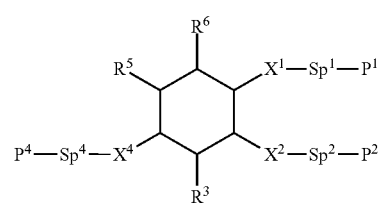

IA-8

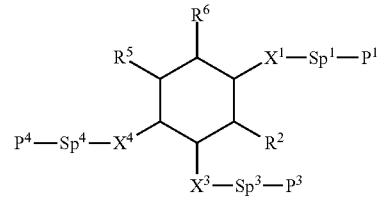

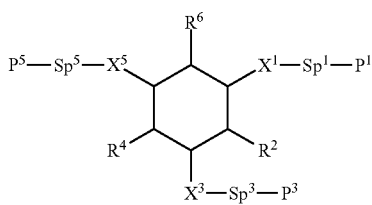
IA-9

Particularly preferred structures I are shown below in sub-formulae IB-1 to IB-9. $Sp^{1-6}$, $P^{1-6}$ and $R^{1-6}$ adopt the meanings indicated for P, Sp and R, and the preferred meanings in each case. $Sp^{1-6}$, $P^{1-6}$ and $R^{1-6}$ may in each case be identical to or different from one another. $P^{1-6}$ particularly preferably denote acrylate or methacrylate. $R^{1-6}$ preferably denote hydrogen, halogen, straight-chain or branched alkyl, alkenyl, alkoxy having 1 to 12 C atoms. $R^{1-6}$ particularly preferably denote straight-chain hydrogen, fluorine, alkyl or alkoxy having 1 to 5 C atoms. $R^{1-6}$ very particularly preferably denote hydrogen, fluorine or methyl, amongst which again preferably hydrogen.

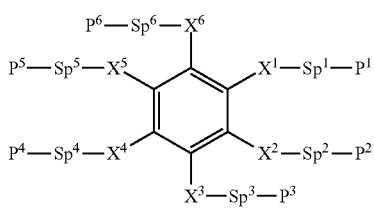
IB-1

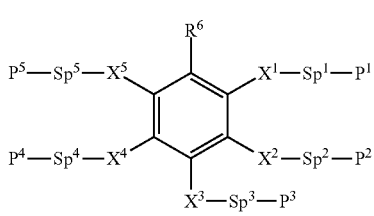
IB-2

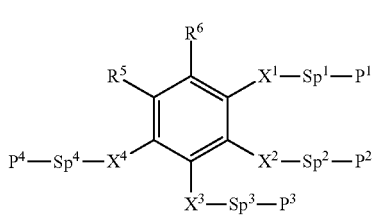
IB-3

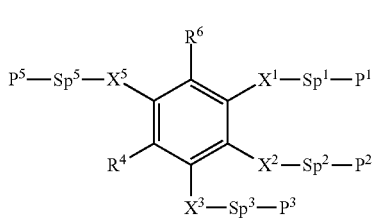
IB-4

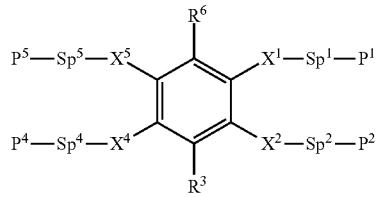
IB-5

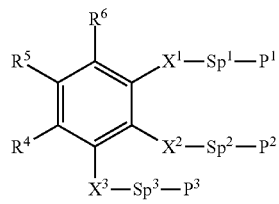
IB-6

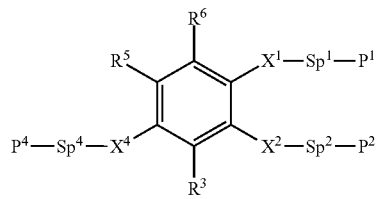
IB-7

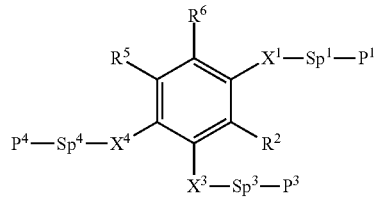
IB-8

IB-9

Selected synthetic processes are described by way of example starting from particularly preferred starting materials. In particular, synthetic processes are described by way of example with reference to cyclohexane-1,3,5-triol (1), cyclohexane-1,2,3-triol (12), (3,4-bis(hydroxymethyl)cyclohexyl)methanol (18), phloroglucine (20), (2,4,5-tris(hydroxymethyl)phenyl)-methanol (28), 1,2,4-trihydroxybenzene (30), 3,5-di(hydroxymethyl)phenol (32), 1,2,4-benzenetricarboxylic acid (34), 2,5-bis(2-carboxyethyl)terephthalic acid (37), 1,2,4,5-cyclohexanetetracarboxylic acid (40), 1,3,5-tribromobenzene (43), 5-hydroxyisophthalic acid (48) and 4-bromoresorcinol (51). This is intended to explain the present invention, but not to restrict it. The person skilled in the art will easily be able to apply the methods described to other starting materials.

Furthermore, the compounds of type I which contain the particularly preferred polymerisable groups of the acrylate type (P equal to $CH_2=CW^1-COO-$) are discussed in particular here. Of these, acrylates ($W^1=H$) and methacrylates ($W^1=CH_3$) are very particularly preferred.

Hydroxyl functions or carboxyl functions are substantially used to build up spacers. —O— or —COO— is thus prespecified as part of spacer -Sp'-X'—. Such compounds are particularly preferred.

Examples of the Build-Up of Spacers Starting from Hydroxyl Compounds

In a particularly preferred process, spacers Sp'-X equal to —OC(O)—$(CH_2)_{p1}$— are built up by thorough esterification using ω-bromoalkanoic acids 2. The locant ω here and below means that the substituent (here bromine) is located at the end of the chain, as, for example, in 5-bromovaleric acid=5-bromopentanoic acid. The resultant compounds 3 can then be converted into polymerisable compounds of type I (for example compound 5 in Scheme 1) by reaction with acrylic acids 4 ($W^1$=H or Me are preferred).

Scheme 1: Synthesis of compounds I where Sp = —O—C(O)—$(CH_2)_{p1}$—
(= 5 in particular) for the example of cyclohexane-1,3,5-triol (1)

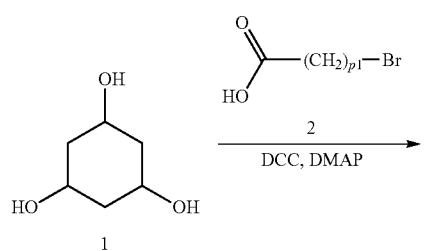

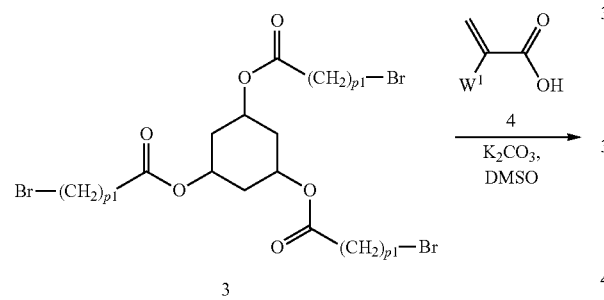

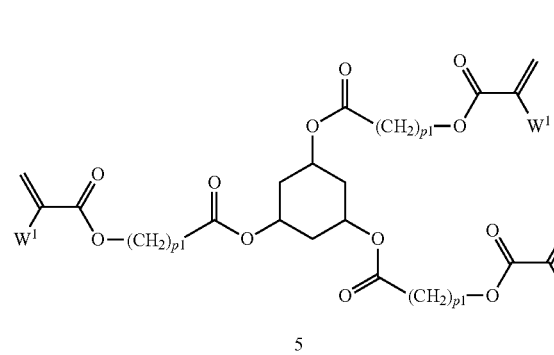

The intermediates 3 can also be synthesised using ω-bromoalkanoyl chlorides. These are obtained from the carboxylic acids 2, for example by reaction with thionyl chloride.

Further preferred compounds are those where Sp'-X=—O—$(CH_2)_{p1}$—, where the parameter p1 is preferably greater than two.

A method for obtaining the particularly preferred compounds where p1=3 is shown in Scheme 2, again for the example of the reaction of cyclohexane-1,3,5-triol (1).

Scheme 2: Synthesis of compounds I where Sp = —O—$(CH_2)_3$—
(= 10 in particular) for the example of the reaction of cyclohexane-1,3,5-triol (1)

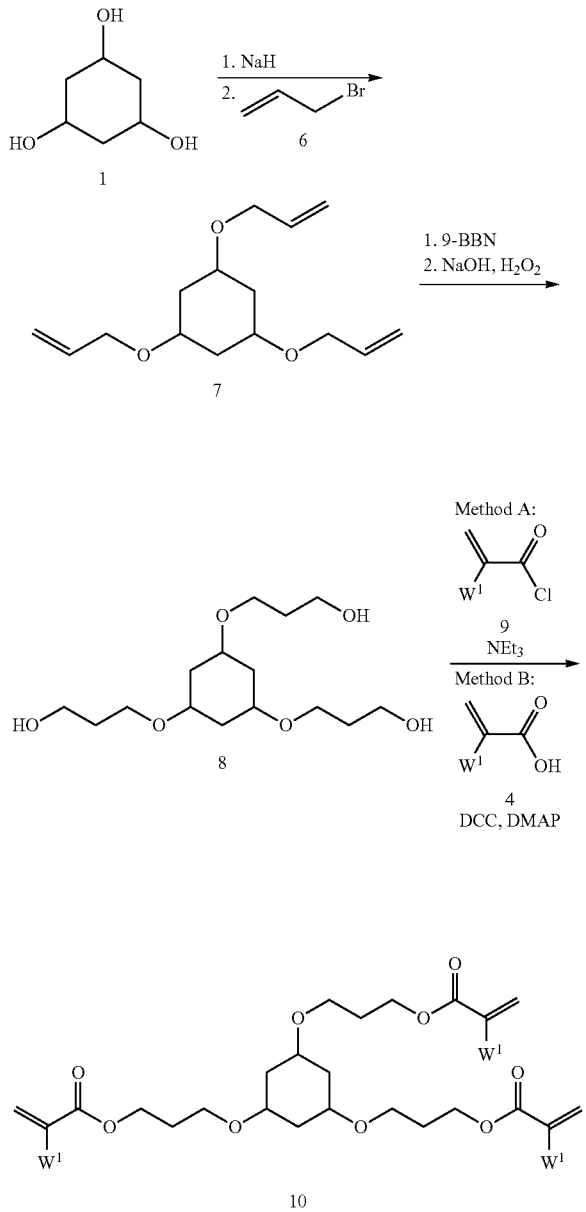

Firstly, 1 is alkylated/allylated using allyl bromide (6). Allyl bromide (6) is a sufficiently strong alkylating agent also to alkylate the secondary alcohol functions effectively and completely. A hydroboration/oxidation reaction to give compound 8 is then carried out in order to build up the 1,3-propylene glycol spacer. Compound 8 is then esterified either using acryloyl chlorides 9 (method A) or acrylic acids 4 (method B) to give the compounds 10.

This reaction sequence can be carried out analogously with other starting materials which are preferred for the purposes of this invention.

The free OH groups of the 1, n-glycol spacers can also be converted into the corresponding bromides 11. Such compounds are likewise valuable intermediates for the synthesis of compounds I.

Scheme 3: Synthesis of alkyl bromides 11 as intermediates for the synthesis of compounds I. Synthesis example of a substance obtained from cyclohexane-1,3,5-triol (1).

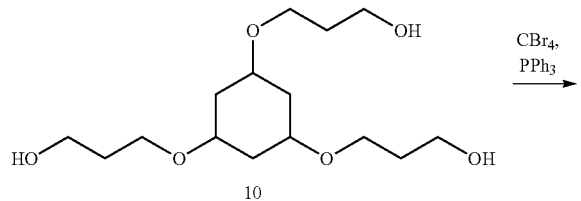

These or similar alkyl bromides can be reacted with carbon nucleophiles, for example alkyl-Grignard reagents of type 14, to give compounds where Sp'-X=—O—$(CH_2)_{p1}$—, where the parameter p1 can be greater than or equal to 3. This is shown in Scheme 4 for the example of the reaction of cyclohexane-1,2,3-triol (12). The alcohol-protecting groups are subsequently removed, giving the alcohols 16. The hydroxyl functions can then be reacted with acrylic acid (derivatives) to give the compounds 17.

Scheme 4: Synthesis of compounds I where Sp = —O—$(CH_2)_{p1}$— and p1 > 3 (= 17 in particular) for the example of the reaction of cyclohexane-1,2,3-triol (12).

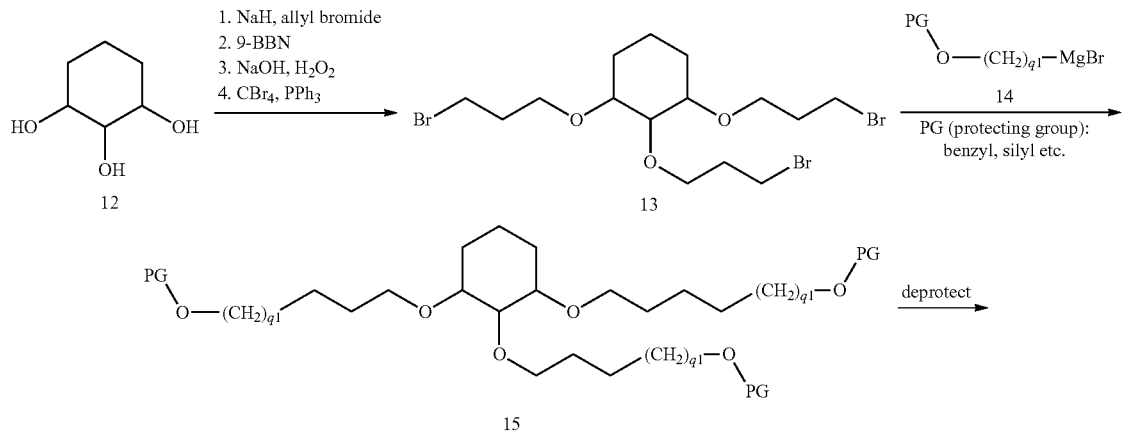

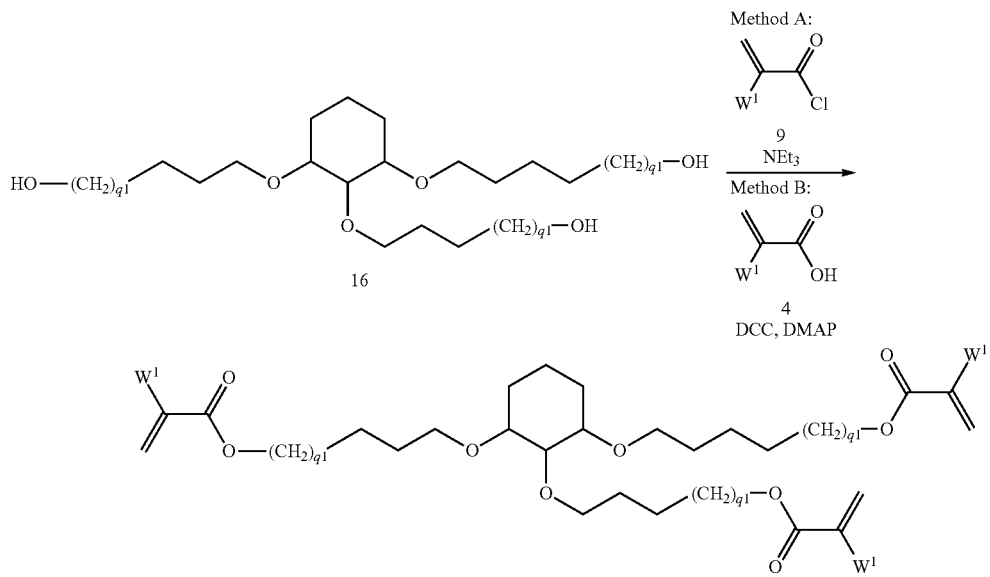

The OH groups of compounds such as, for example, compound 10 can of course also be converted into other suitable leaving groups. Besides bromides, particular preference is also given to iodides, tosylates, mesylates or triflates (in each case not depicted).

In all cases, suitable starting materials containing hydroxyl groups can also be reacted directly with acrylic acids or acryloyl chlorides. This is shown in Scheme 5 for the example of the reaction of (3,4-bishydroxymethylcyclohexyl)methanol (18).

Scheme 5: Synthesis of compounds I (= 19 in particular) for the example of the reaction of (3,4-bishydroxymethylcyclohexyl)methanol (18) with acrylic acids 4 or acryloyl chlorides 9.

Compounds containing phenolic hydroxyl functions are particularly preferred compounds for the purposes of the present invention. A multiplicity of reactions for suitable functionalisation is known to the person skilled in the art. For example, phloroglucine (20), for example, can be reacted directly with commercially available 2-hydroxyethyl acrylates (Mitsunobu reaction, not depicted here) or 2-bromoethyl acrylates 21. In the reaction with ω-bromoalkanols 23, spacer groups $Sp=-O-(CH_2)_{p1}-$ are built up, and the reaction with ω-bromoalkanoic acids 2 is also a preferred form of functionalisation. These possibilities are summarised in Scheme 6.

Scheme 6: Synthesis of compounds I (= 22, 25 and xx in particular). Illustrative with reference to reactions of phloroglucine (20).

A: Reaction with 2-bromoethyl acrylates 21

B: Reaction with ω-bromoalkanols 23

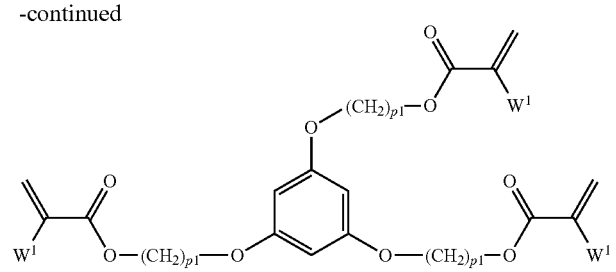
25
C: Reaction with ω-bromoalkanoic acids 2
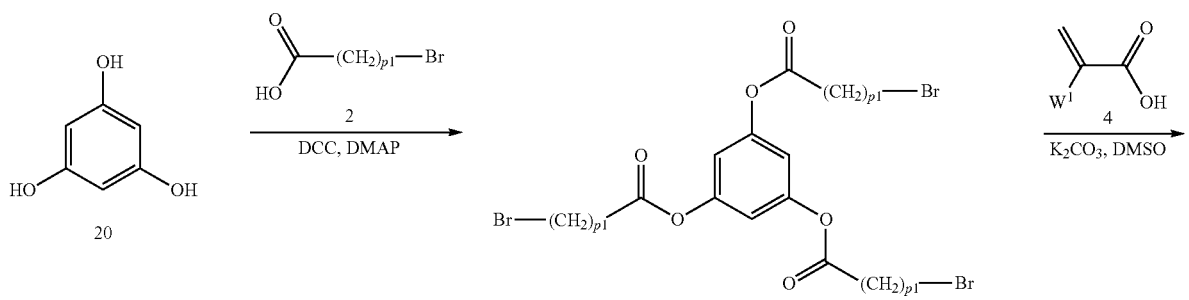
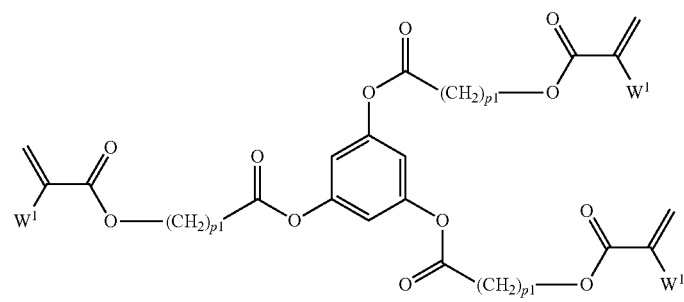
27

Corresponding starting materials containing aromatic units can preferably also be converted directly into acrylates (cf. Scheme 7).

Scheme 7: Synthesis of compounds I (= 29, 31 and 33 in particular). Illustrative with reference to the reaction of (2,4,5-trishydroxymethyl-phenyl)methanol (28), 1,2,4-trihydroxybenzene (30) and 3,5-(dihydroxymethyl)phenol (32)

A: Reaction of (2,4,5-trishydroxymethylphenyl)methanol (28)

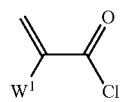
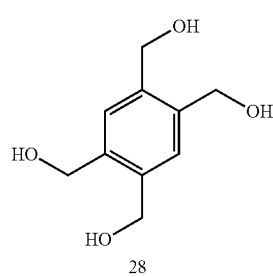
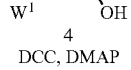

B: Reaction of 1,2,4-trihydroxybenzene (30)

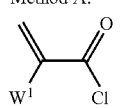
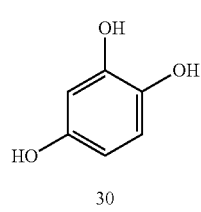
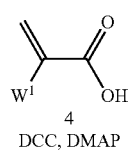

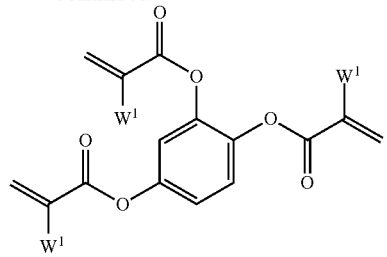

C: Reaction of 3,5-(dihydroxymethyl)phenol (32)

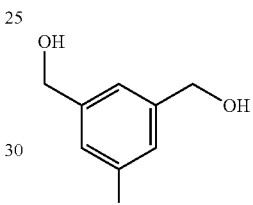
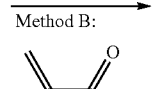
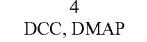

Examples of the Build-Up of Spacers Starting from Carboxylic Acids

Compounds containing carboxyl functions are particularly suitable for the further functionalisation. In a preferred process, compounds containing a plurality of carboxyl functions are reacted with ω-bromoalkanols 23. The reaction with acrylic acids is subsequently carried out in the presence of a base (cf. Scheme 8).

Scheme 8: Synthesis of compounds I (= 36 and 39 in particular) starting from compounds containing carboxyl functions. Illustrative with reference to the reaction of 1,2,4-benzenetricarboxylic acid (34) and 2,5-bis(2-carboxyethyl)terephthalic acid (37)
A: Reaction of 1,2,4-benzenetricarboxylic acid (34)
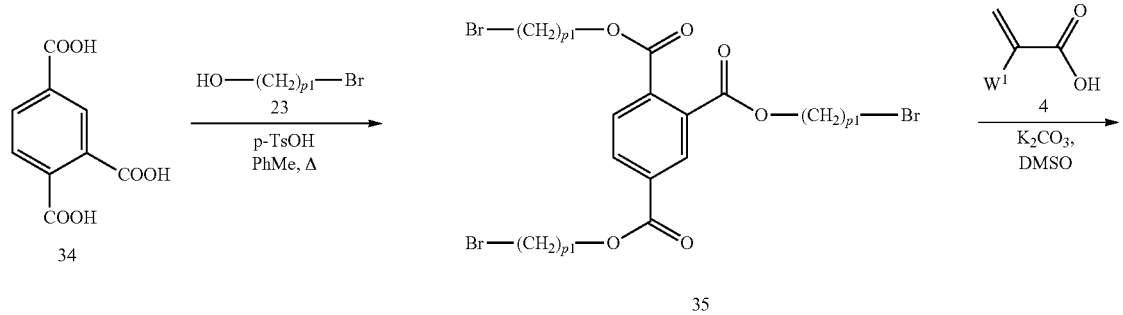
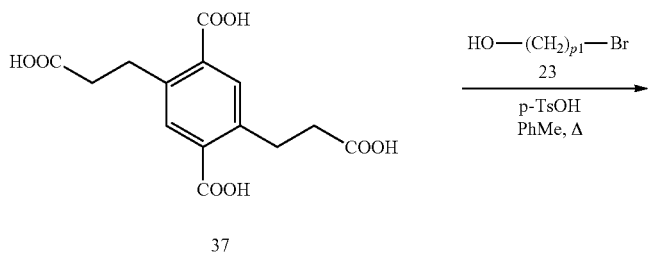
B: Reaction of 2,5-bis(2-carboxyethyl)terephthalic acid (37)
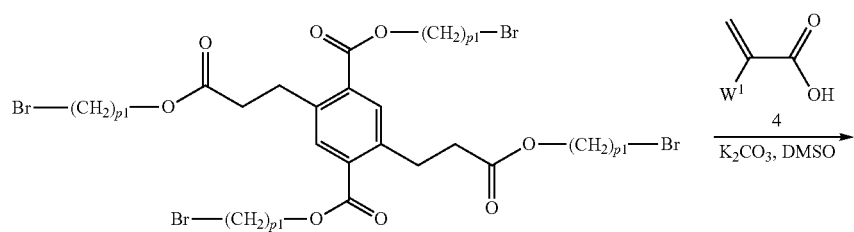

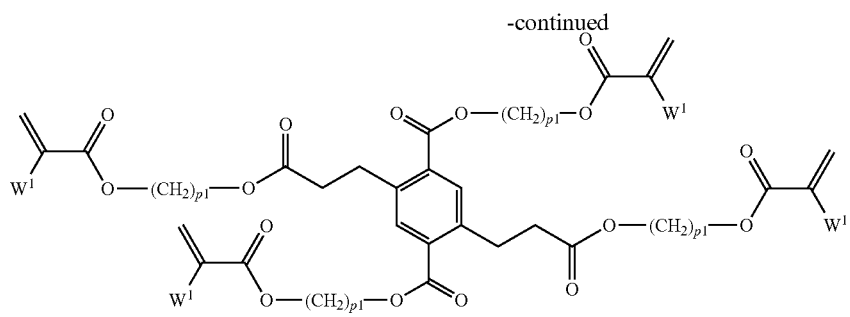

39

Preference is furthermore also given to esterification using hydroxyalkyl acrylates, for example 2-hydroxyethyl acrylates 41.

Scheme 9: Synthesis of compounds I (= 42 in particular) by esterification of carboxyl functions using ω-hydroxyalkyl acrylates. Illustrative with reference to the reaction of 1,2,4,5-cyclohexanetetracarboxylic acid (40) with 2-hydroxyethyl acrylates 41.

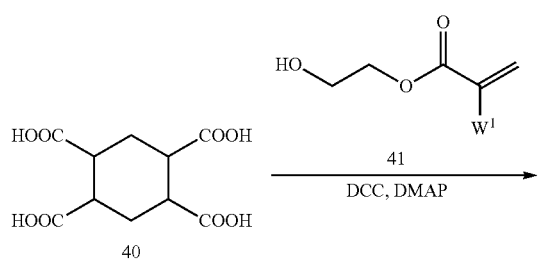

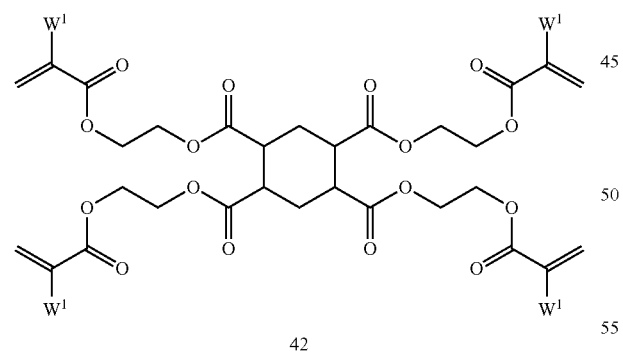

42

Examples of the Build-Up of Spacers Starting from Aryl Bromides

Starting from aryl bromides or aryl halides in general, the synthesis of preferred compounds of the formula I is carried out, for example, by a Sonogashira coupling to ω-alkynols 44. This is depicted in Scheme 10 by way of example for the reaction of 1,3,5-tribromobenzene (43). The coupling product 45 can, for example, be hydrogenated, giving, after introduction of acrylate groups, compounds I (47 in particular) where Sp=$(CH_2)_{p1}$.

Scheme 10: Synthesis of compounds I (= 47 in particular) by Sonogashira coupling to alkynols 44. Illustrative with reference to the reaction of 1,3,5-tribromobenzene (43).

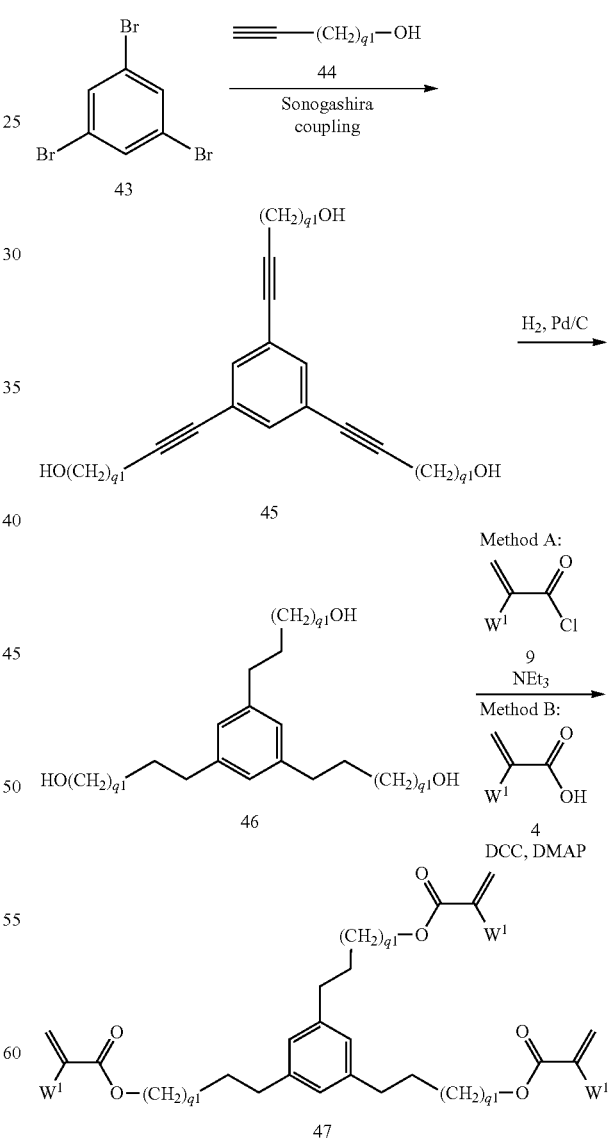

The person skilled in the art will be able to use or prepare suitable starting materials and thus obtain a multiplicity of compounds I. The spacer groups present in a molecule may be identical to one another or alternatively also different from one another.

The reaction of 5-hydroxyisophthalic acid (48) with ω-bromoalkanols 23 gives, for example, the compounds 49, which can be reacted with acrylic acids. This is depicted in Scheme 11.

Scheme 11: Synthesis of compounds I (= 50 in particular) containing different groups Sp—P.
Illustrative with reference to the reaction of 5-hydroxy-isophthalic acid (48).

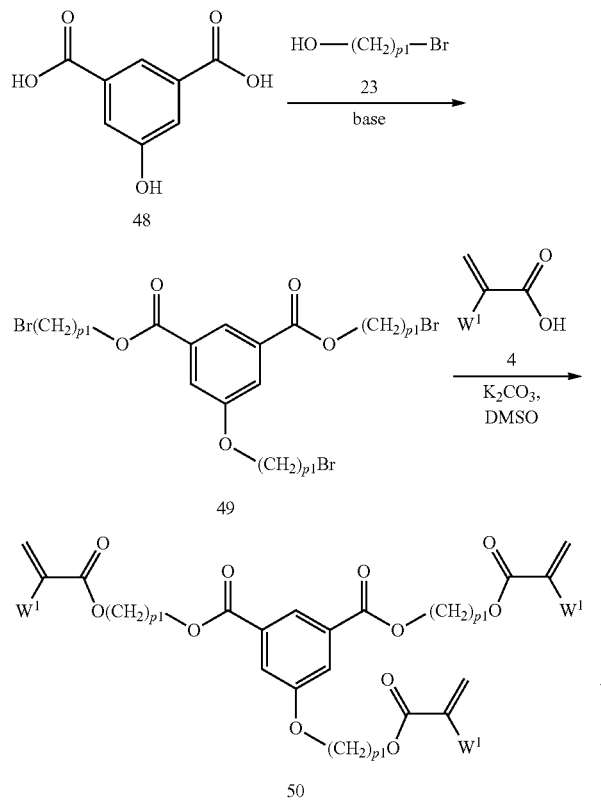

The transformation of individual functional groups can also be carried out stepwise. 4-Bromoresorcinol (51) can be reacted with ω-alkynols 44 in a Sonogashira reaction to give the compounds 52. These compounds are subsequently hydrogenated. The compounds 54, for example, are then obtained from the products 53 in the reaction with acrylic acids or acryloyl chlorides.

Scheme 12: Synthesis of compounds I (= 54 in particular) by Sonogashira coupling to alkynols 44. Illustrative with reference to the reaction of 4-bromoresorcinol (51).

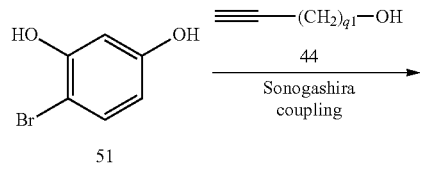

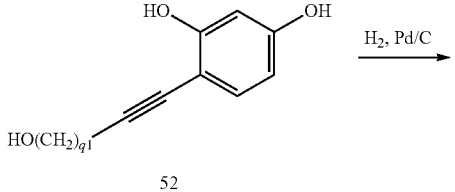

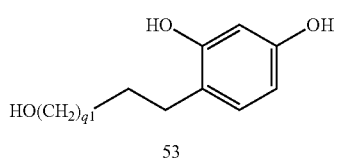

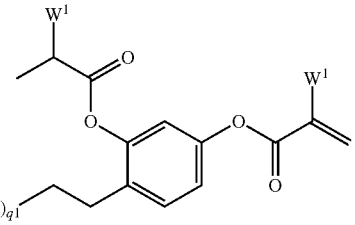

Here too, the person skilled in the art will be able to combine suitable starting materials and reaction sequences in a suitable manner.

The invention thus furthermore relates in general to a process for the preparation of compounds of the formula I as defined for the compounds by derivatisation of polyols and polycarboxylic acids of simple carbocycles containing a ring system in accordance with group $A^1$ in accordance with formula I.

The following are illustrative embodiments of preferred compounds. In the formulae and sub-formulae, $p_1$ adopts a value between 0 and 12, preferably a value between 0 and 8, particularly preferably a value between 2 and 6, where $p_1$ does not adopt the value 0 if $(CH_2)_{p_1}$ is between two groups selected from O and (CO). The variable $p_1$ may be identical within a molecule or may adopt different values. Preferably, all $p_1$ are equal.

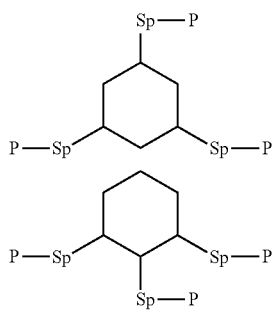

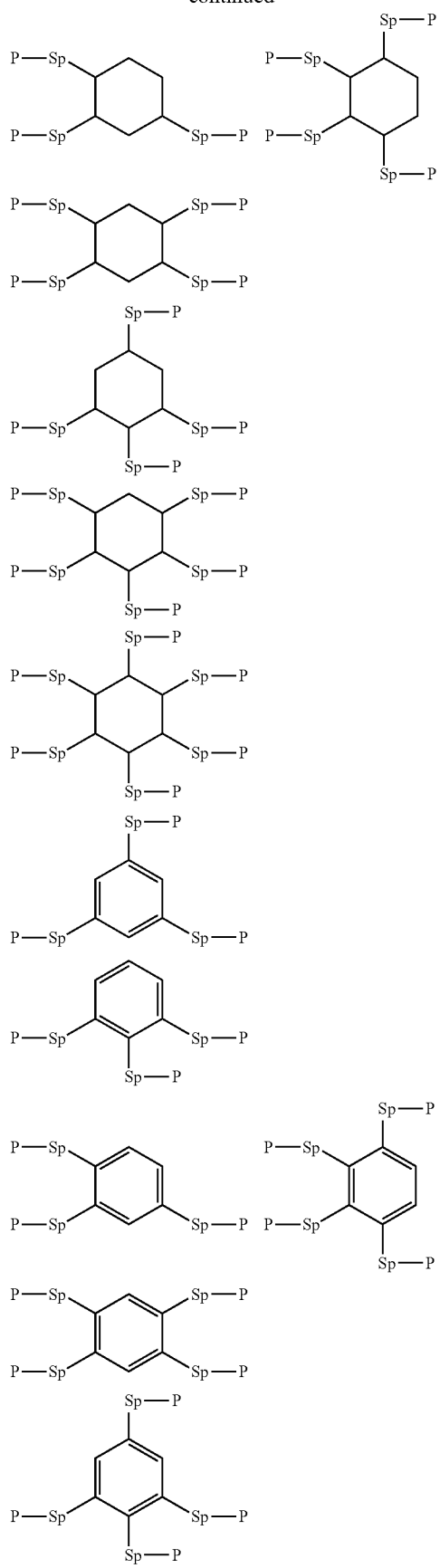
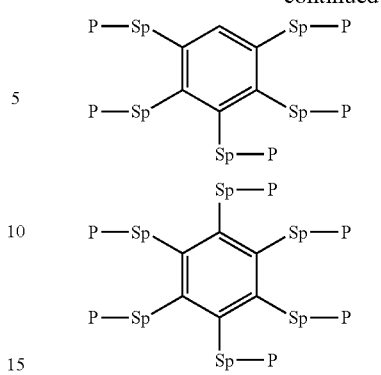
in which Sp and P are as defined above. The substituents (-Sp-P) on these example compounds preferably denote a group as described below.
The polymerisable groups P together with the spacer Sp, i.e. -Sp-P, preferably denote the following in general and in particular in the preceding structures:
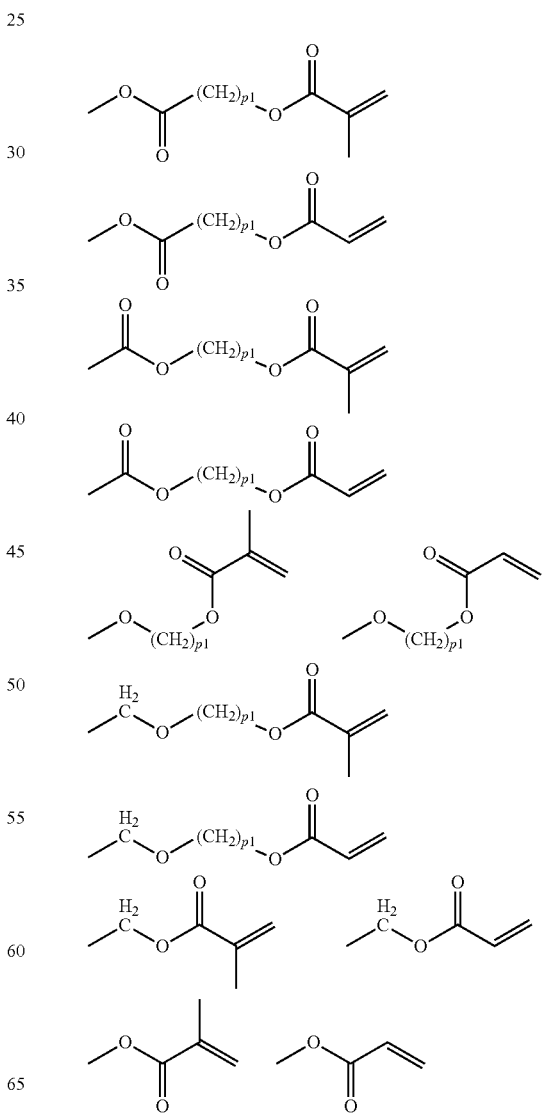

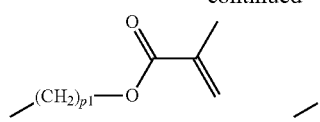
or combinations thereof, as in the following compounds:
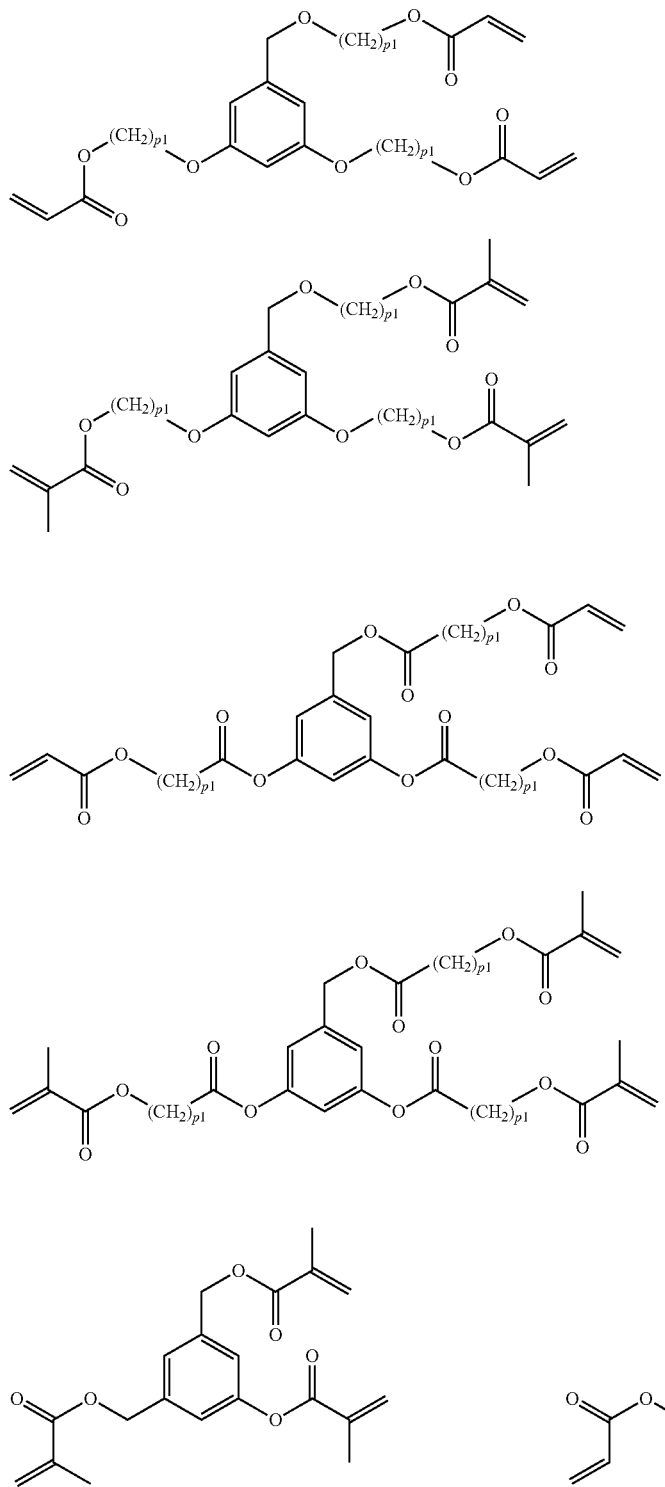

-continued
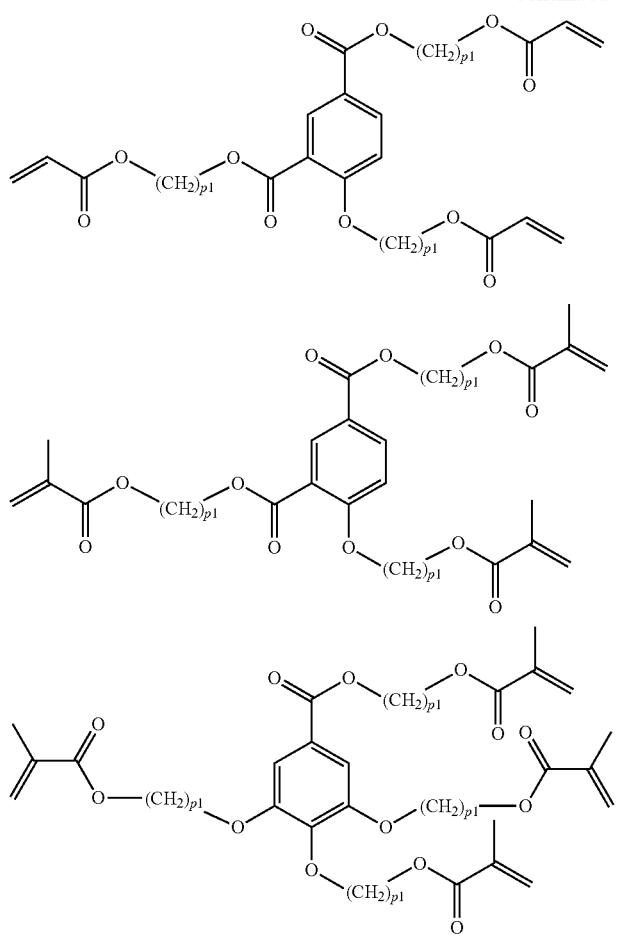
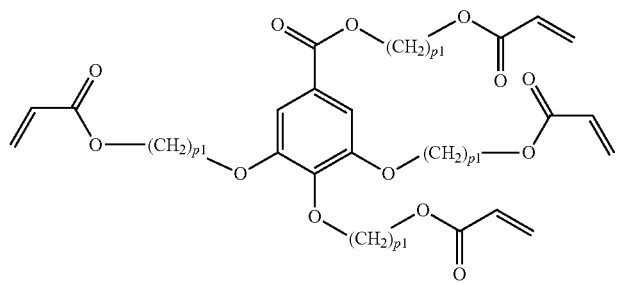
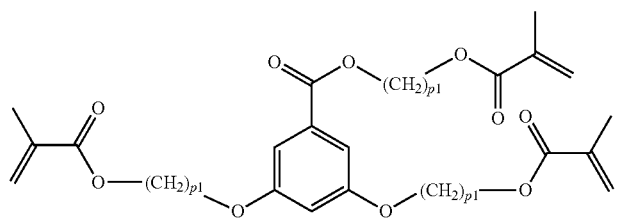
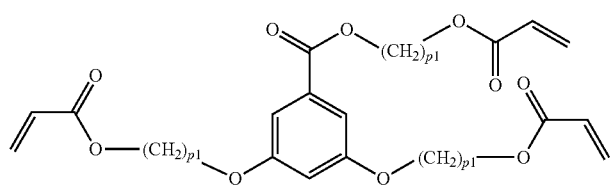

The invention relates to the use of the compounds of the formula I in LC media, in particular the use as polymer in such media. The compounds are also used for the preparation of a polymer for the stabilisation of liquid-crystalline phases, in particular of blue phases.

The use of polymers for the stabilisation of liquid-crystalline phases is basically known and is described in the cited literature and in the example part for the case of blue phases. In general, the medium is polymerised at a temperature at which it is in the blue phase. This considerably broadens the stability range of this phase.

Preferred LC media are characterised in that they have, after stabilisation of the blue phase by polymerisation, a blue phase at least in the range from 15 to 30° C., preferably from 10 to 40° C., particularly preferably from 0 to 50° C. and very particularly preferably from −10 to 60° C.

The present invention likewise relates, as mentioned at the outset, to liquid-crystalline media which comprise a polymer which includes at least one polymerised monomer component of the formula I and optionally further polymerised monomers, or which comprise at least one unpolymerised monomer of the formula I, or both.

The LC medium preferably comprises a liquid-crystalline component, also referred to below as "LC host mixture", comprising one or more, preferably two or more, low-molecular-weight (i.e. monomeric and unpolymerisable) compounds as described above and below, which are preferably mesogenic or liquid-crystalline.

Particularly preferred media according to the invention are mentioned below:

The medium is in a blue phase and/or a nematic phase at at least one temperature before or after the polymerisation.

The following concentration data refer to the use of compounds of the formula I as stabilisation of the blue phase. The medium comprises one or more monoreactive monomers or a polymer which is built up from one or more monoreactive monomers and optionally further monomers. The proportion of monoreactive monomers is preferably 1 to 15% by weight, particularly preferably 2 to 12% by weight. Monoreactive compounds of this type, for example containing a (meth) acrylate group, are adequately known to the person skilled in the art.

Besides the above-mentioned monoreactive monomers, the medium comprises one or more compounds acting as crosslinking agents, which are distinguished by a plurality of reactive groups. These include the compounds of the formula I.

The medium comprises one or more direactive monomers or a polymer which is built up from one or more direactive monomers and optionally further monomers. The proportion of direactive monomers is preferably 0 to 9% by weight, particularly preferably 0 to 5% by weight. In a preferred embodiment, all or some of the direactive monomers are replaced by the compounds of the formula I according to the invention containing three or more reactive groups. The sum of monoreactive and direactive monomers is preferably 3 to 17% by weight, particularly preferably 6-14% by weight.

It is also possible to employ trireactive or polyreactive (>3) monomers. Some or all of the trireactive or polyreactive (>3) monomers preferably belong to the compounds of the formula I.

The ratio of monoreactive monomers to crosslinking agents is preferably between 3:1 and 1:1. The ratio is dependent on the number of reactive groups of the crosslinking agents involved. On use of tetrareactive crosslinking agents, it is particularly preferably between 3:1 and 2:1, while on use of direactive crosslinking agents, it is particularly preferably between 1.5:1 and 1:1.

For the PSA technique, relatively small amounts of polymerisable compounds are employed. The LC media according to the invention for use in PSA displays preferably comprise <5% by weight, particularly preferably <1% by weight and very particularly preferably <0.5% by weight of polymerisable compounds, in particular polymerisable compounds of the formula I, optionally in combination with a mono- or direactive component. In order to achieve an adequate effect, 0.2% by weight or more are preferably employed. The optimal amount is dependent on the layer thickness.

Monoreactive monomers have, for example, a structure of the formula $$R^a\text{-Sp-P,}$$

in which

P denotes a polymerisable group,

Sp denotes a spacer group or a single bond, and $R^a$ denotes an organic radical having at least 3 C atoms.

The radical $R^a$ can be a so-called mesogenic radical, which generally contains one or more rings, or a simple, generally chain-form, non-mesogenic radical.

Non-mesogenic radicals are preferably straight-chain or branched alkyl having 1 to 30 C atoms, in which, in addition, one or more non-adjacent $CH_2$ groups may each be replaced, independently of one another, by) —C($R^0$)=C($R^{00}$)—, —C≡C—, —N($R^{00}$)—, —O—, —S—, —CO—, —CO—O—, —O—CO—, —O—CO—O— in such a way that O and/or S atoms are not linked directly to one another, and in which, in addition, one or more H atoms may be replaced by F, Cl, Br, I or CN.

Preferred meanings of P and Sp correspond to the meanings indicated below for formula I*.

$R^a$ is particularly preferably a radical of the formula

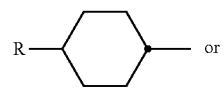 or

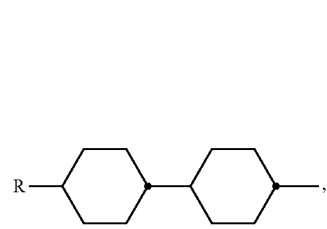

in which

R in each case, independently of one another, denotes a halogenated or unsubstituted alkyl radical having 1 to 15 C atoms, where, in addition, one or more $CH_2$ groups in these radicals may each be replaced, independently of one another, by —C≡C—, —CH=CH—, —(CO)O—, —O(CO)—, —(CO)— or —O— in such a way that O atoms are not linked directly to one another.

Preferred mesogenic monomers containing one, two or more polymerisable groups are selected, for example, from Table D:

TABLE D
Table D shows example compounds which can preferably be used as reactive mesogenic compounds in the LC media in accordance with the present invention.
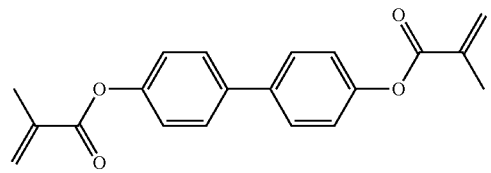 [SMILES: C=C(C)C(=O)Oc1ccc(-c2ccc(OC(=O)C(=C)C)cc2)cc1]
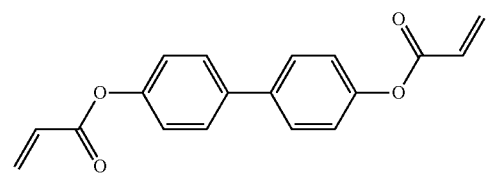 [SMILES: C=CC(=O)Oc1ccc(-c2ccc(OC(=O)C=C)cc2)cc1]
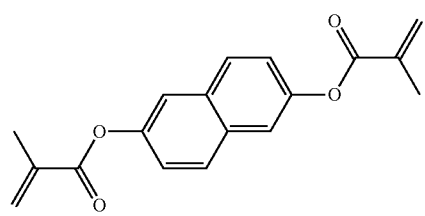 [SMILES: C=C(C)C(=O)Oc1ccc2cc(OC(=O)C(=C)C)ccc2c1]
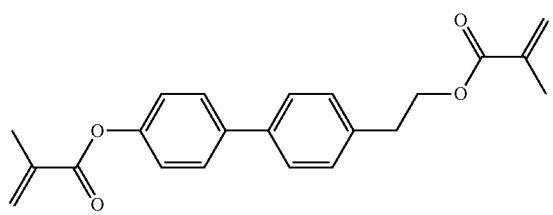 [SMILES: C=C(C)C(=O)OCCc1ccc(-c2ccc(OC(=O)C(=C)C)cc2)cc1]
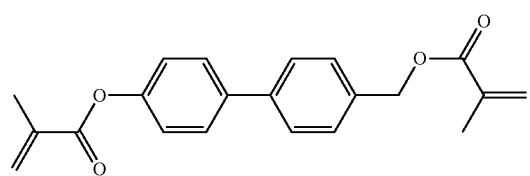 [SMILES: C=C(C)C(=O)OCc1ccc(-c2ccc(OC(=O)C(=C)C)cc2)cc1]
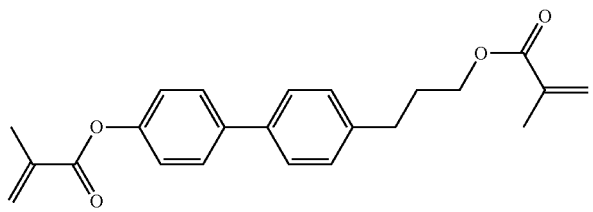 [SMILES: C=C(C)C(=O)OCCCc1ccc(-c2ccc(OC(=O)C(=C)C)cc2)cc1]
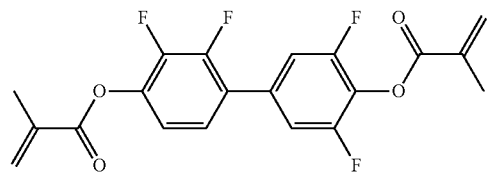 [SMILES: C=C(C)C(=O)Oc1ccc(-c2cc(F)c(OC(=O)C(=C)C)c(F)c2)c(F)c1F]
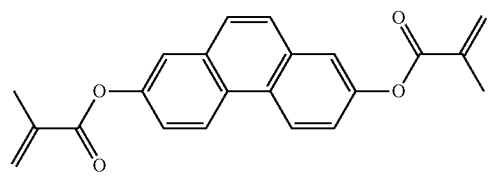 [SMILES: C=C(C)C(=O)Oc1ccc2c(ccc3cc(OC(=O)C(=C)C)ccc32)c1]

TABLE D-continued
Table D shows example compounds which can preferably be used as reactive mesogenic compounds in the LC media in accordance with the present invention.
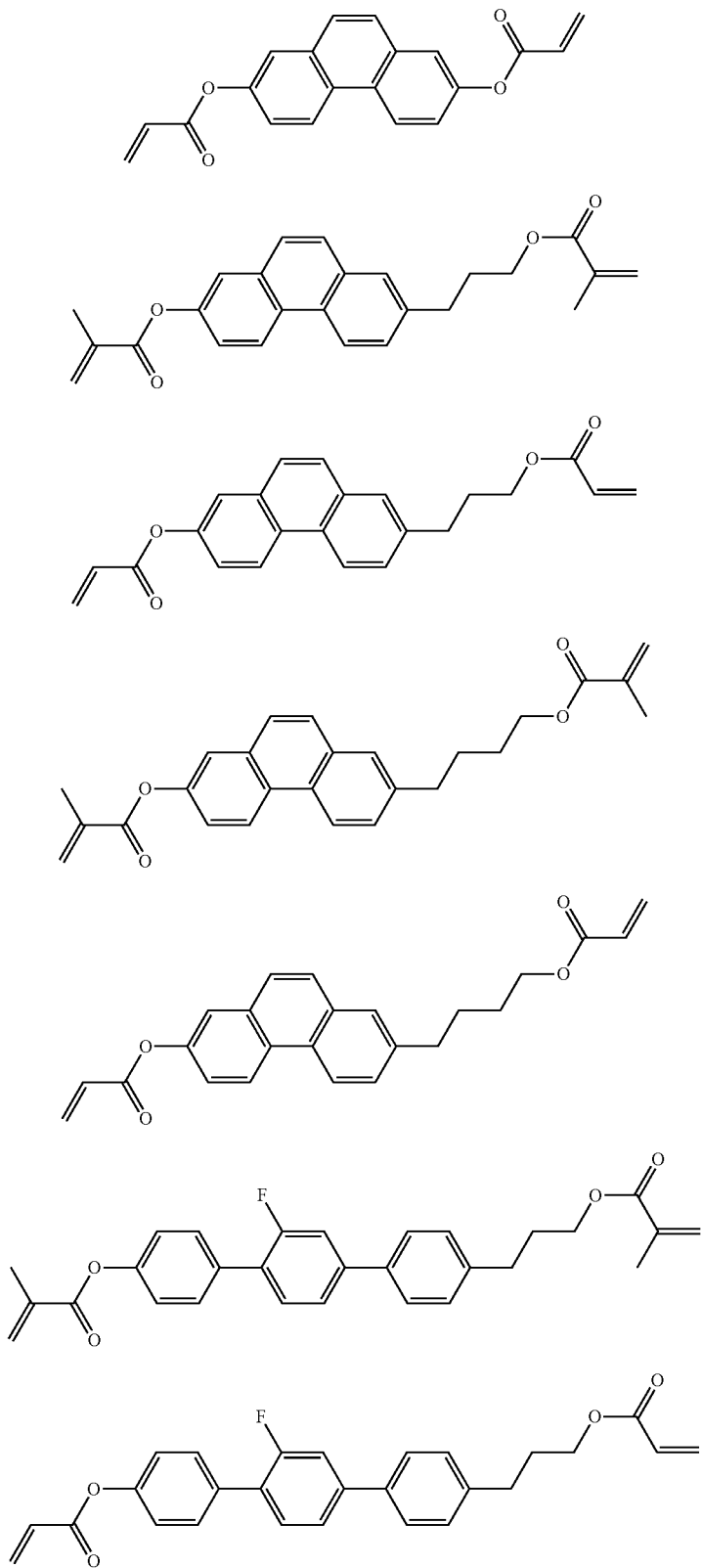

TABLE D-continued
Table D shows example compounds which can preferably be used as reactive mesogenic compounds in the LC media in accordance with the present invention.
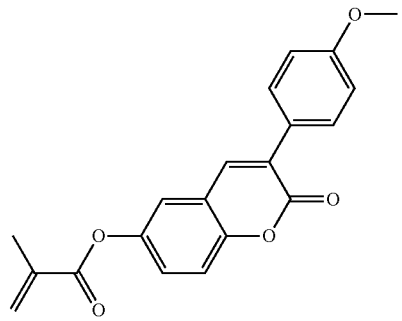 [SMILES: C=C(C)C(=O)Oc1ccc2oc(=O)c(-c3ccc(OC)cc3)cc2c1]
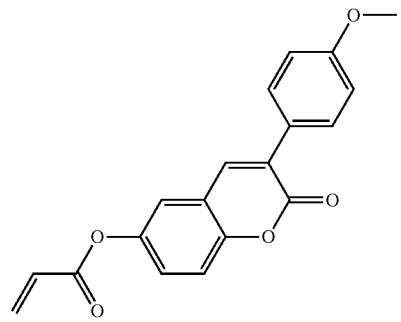 [SMILES: C=CC(=O)Oc1ccc2oc(=O)c(-c3ccc(OC)cc3)cc2c1]
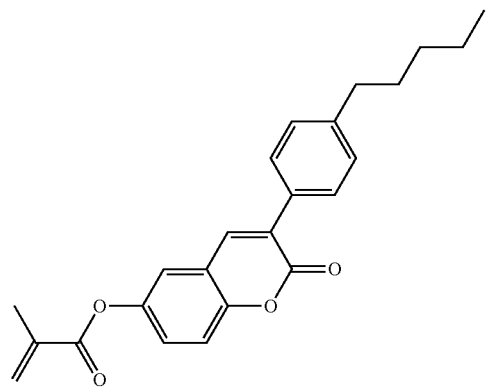 [SMILES: C=C(C)C(=O)Oc1ccc2oc(=O)c(-c3ccc(CCCCC)cc3)cc2c1]
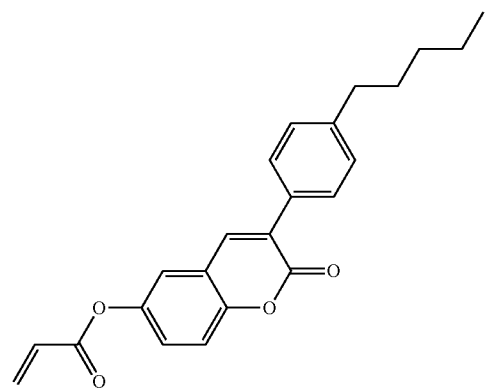 [SMILES: C=CC(=O)Oc1ccc2oc(=O)c(-c3ccc(CCCCC)cc3)cc2c1]

TABLE D-continued
Table D shows example compounds which can preferably be used as reactive mesogenic compounds in the LC media in accordance with the present invention.
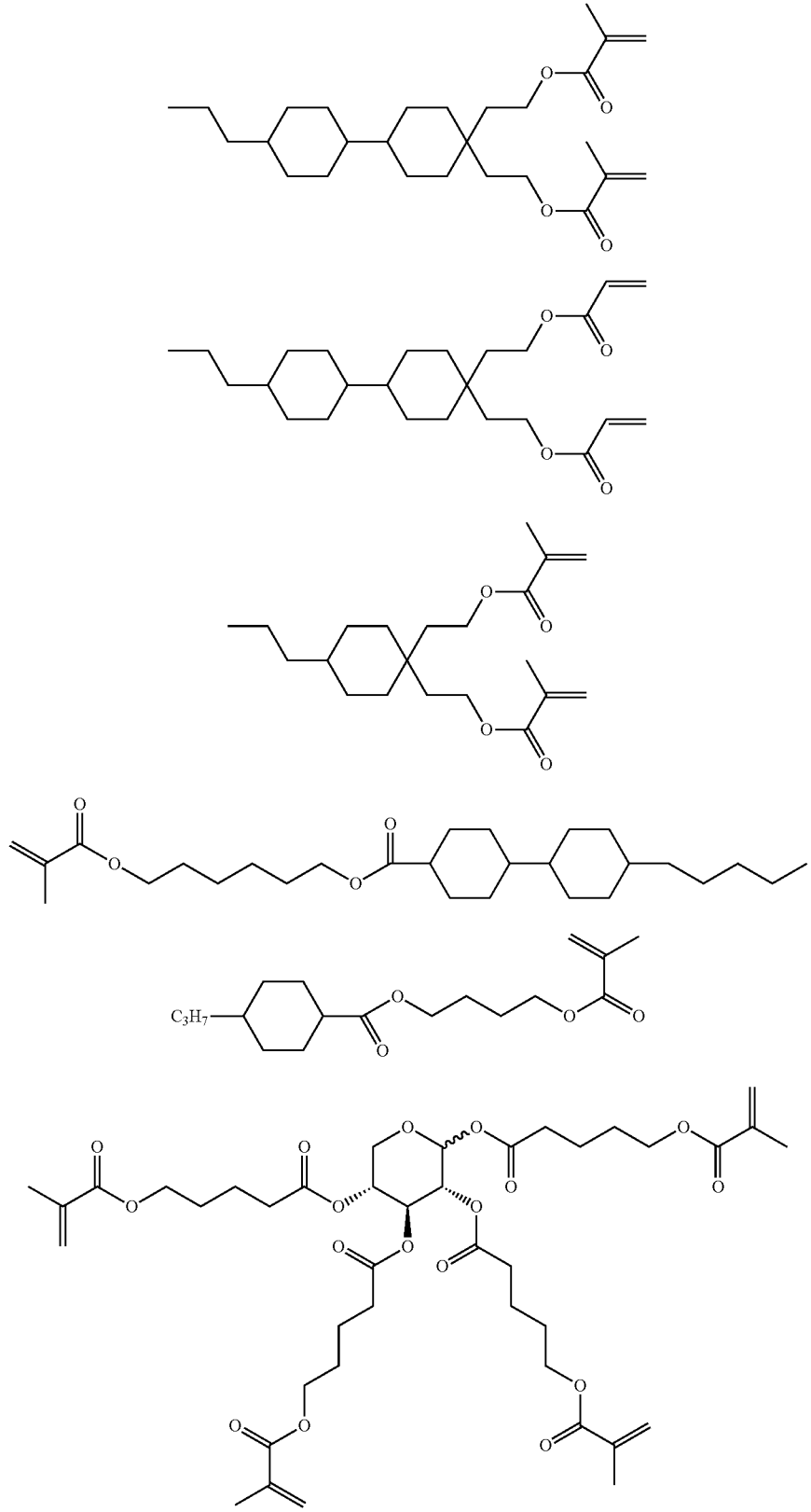

TABLE D-continued

Table D shows example compounds which can preferably be used as reactive mesogenic compounds in the LC media in accordance with the present invention.

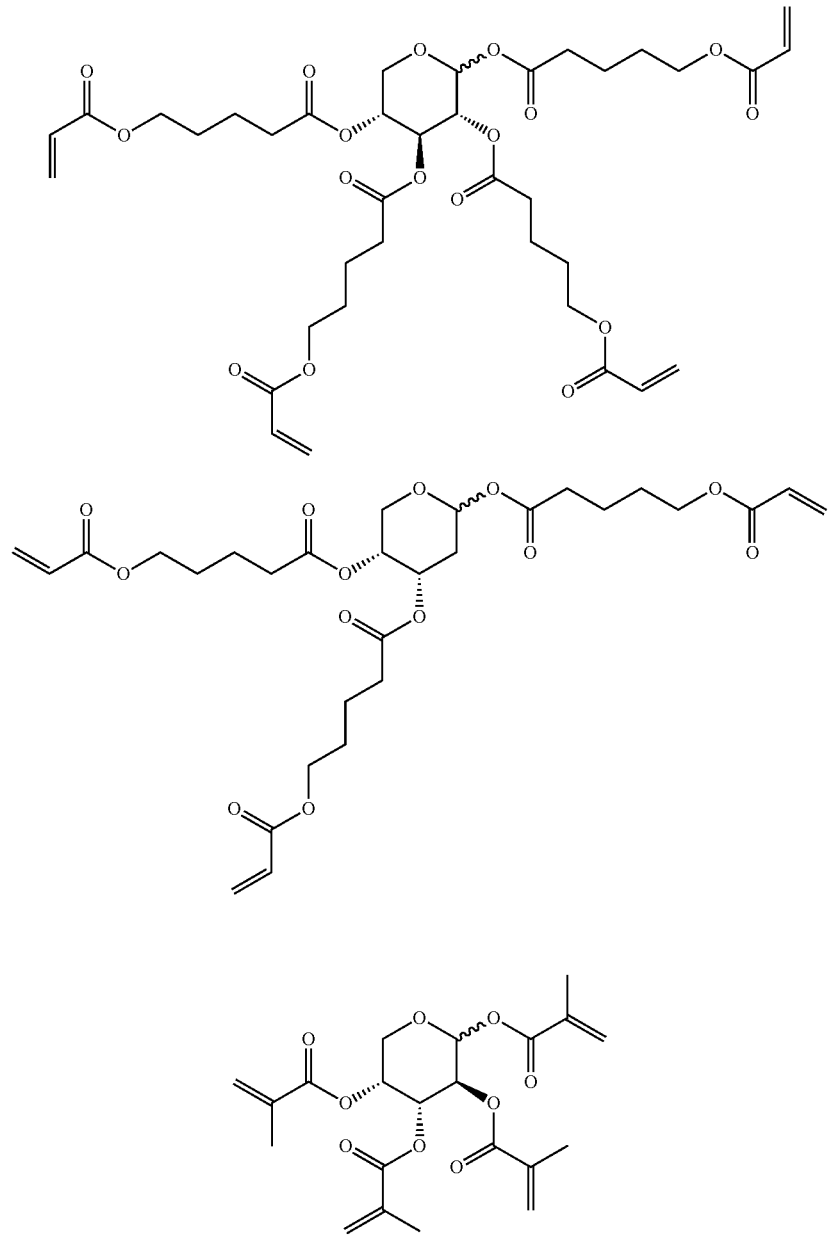

In a preferred embodiment of the present invention, the mesogenic media comprise one or more compounds selected from the group of the compounds from Table D.

In a further preferred embodiment of the invention, P-Sp- in the formula I denotes a radical containing two or more polymerisable groups (multifunctional polymerisable radicals). Suitable radicals of this type, and polymerisable compounds containing them and the preparation thereof are described, for example, in U.S. Pat. No. 7,060,200 B1 or US 2006/0172090 A1. Particular preference is given to multifunctional polymerisable radicals selected from the following formulae:

| | |
|---|---|
| —X-alkyl-CHP$^1$—CH$_2$—CH$_2$P$^2$ | I*a |
| —X-alkyl-C(CH$_2$P$^1$)(CH$_2$P$^2$)—CH$_2$P$^3$ | I*b |
| —X-alkyl-CHP$^1$CHP$^2$—CH$_2$P$^3$ | I*c |
| —X-alkyl-C(CH$_2$P$^1$)(CH$_2$P$^2$)—C$_{aa}$H$_{2aa+1}$ | I*d |
| —X-alkyl-CHP$^1$—CH$_2$P$^2$ | I*e |
| —X-alkyl-CHP$^1$P$^2$ | I*f |
| —X-alkyl-CP$^1$P$^2$—C$_{aa}$H$_{2aa+1}$ | I*g |

—X-alkyl-C(CH$_2$P$^1$)(CH$_2$P$^2$)—CH$_2$OCH$_2$—C(CH$_2$P$^3$)(CH$_2$P$^4$)CH$_2$P$^5$     I*h —X-alkyl-CH((CH$_2$)$_{aa}$P$^1$)((CH$_2$)$_{bb}$P$^2$)     I*i —X-alkyl-CHP$^1$CHP$^2$—C$_{aa}$H$_{2aa+1}$     I*k —X-alkyl-C(CH$_3$)(CH$_2$P$^1$)(CH$_2$P$^2$)     I*m —X—CH(alkyl-P)-alkyl-P     I*n in which X is as defined for formula I, alkyl denotes a single bond or straight-chain or branched alkylene having 1 to 12 C atoms, in which one or more non-adjacent CH$_2$ groups may each be replaced, independently of one another, by —C(R$^{00}$)=C(R$^{000}$)—, —C≡C—, —N(R$^{00}$)—, —O—, —S—, —CO—, —CO—O—, —O—CO—, —O—CO—O— in such a way that O and/or S atoms are not linked directly to one another and in which, in addition, one or more H atoms may be replaced by F, Cl or CN, where R$^{00}$ and R$^{000}$ have the meanings indicated above, aa and bb each, independently of one another, denote 0, 1, 2, 3, 4, 5 or 6, and P$^{1-5}$ each, independently of one another, have one of the meanings indicated for P.

The polymerisable compounds and RMs can be prepared analogously to the process known to the person skilled in the art and described in standard works of organic chemistry, such as, for example, in Houben-Weyl, Methoden der organischen Chemie [Methods of Organic Chemistry], Thieme-Verlag, Stuttgart. Further synthetic methods are given in the documents cited above and below. In the simplest case, RMs of this type are synthesised, for example, by esterification or etherification of 2,6-di-hydroxynaphthalene or 4,4'-dihydroxybiphenyl using corresponding acids, acid derivatives or halogenated compounds containing a group P, such as, for example, (meth)acryloyl chloride or (meth)acrylic acid, in the presence of a dehydrating reagent, such as, for example, DCC (dicyclohexylcarbodiimide).

As a further component, the liquid-crystalline media preferably comprise non-polymerisable compounds which support the liquid-crystalline phase, which are also known as host mixture. This proportion is typically 50 to 95% by weight, preferably 80 to 90% by weight. In the case of polymer-stabilised blue phases, the non-polymerisable fraction preferably comprises compounds selected from Table A (see example part). The fraction preferably consists of 50% by weight or more of these compounds, very particularly preferably 80% by weight or more.

The liquid-crystalline media according to the invention having a blue phase preferably have positive dielectric anisotropy. They can be conceived in such a way that they have very high dielectric anisotropy combined with high optical anisotropy values.

The liquid-crystalline media preferably comprise one or more compounds selected from the formulae II and III:

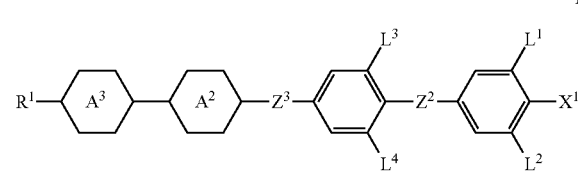

II

-continued

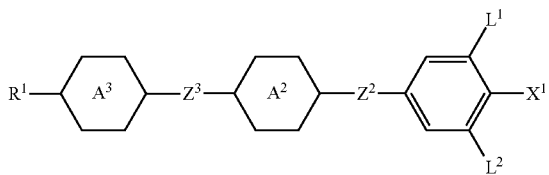

III in which

R$^1$ in each case, independently of one another, denotes an unsubstituted alkyl radical having 1 to 15 C atoms, where, in addition, one or more CH$_2$ groups in this radical may each be replaced, independently of one another, by —C≡C—, —CH=CH—, —CF=CF—, —CF=CH—, —CH=CF—, —(CO)O—, —O(CO)—, —(CO)— or —O— in such a way that O atoms are not linked directly to one another, preferably a straight-chain alkyl radical having 2 to 7 C atoms, A$^2$, A$^3$, independently of one another, denote

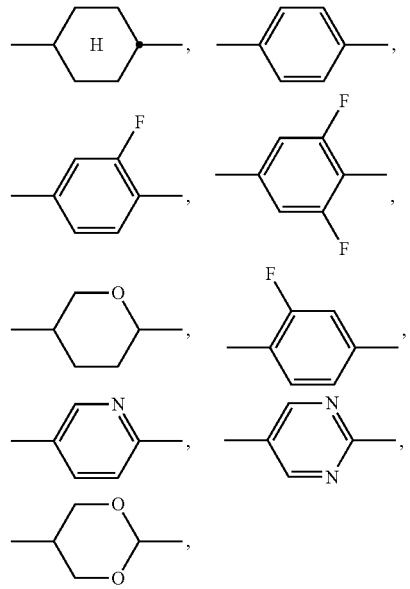

Z$^2$, Z$^3$, independently of one another, denote a single bond, CF$_2$O, CH$_2$CH$_2$, CF$_2$CH$_2$, CF$_2$CF$_2$, CFHCFH, CFHCH$_2$, (CO)O, CH$_2$O, C≡C, CH=CH, CF=CH, CF=CF, where asymmetrical connecting members (for example CF$_2$O) may be oriented in both possible directions, X$^1$ denotes F, Cl, CN, or alkyl, alkenyl, alkenyloxy, alkylalkoxy or alkoxy having 1 to 3 C atoms, which is mono- or polysubstituted by F, and L$^1$ to L$^4$ denote H or F.

The liquid-crystalline media preferably comprise between 20 and 95% by weight of compounds of the formula II. The compounds of the formula III are preferably, if present, employed in an amount of up to 40% by weight. The remaining other compounds, if present, are selected from further compounds having high dielectric anisotropy, high optical anisotropy and preferably having a high clearing point.

Preferred compounds of the formula II are those of the formula IIa:

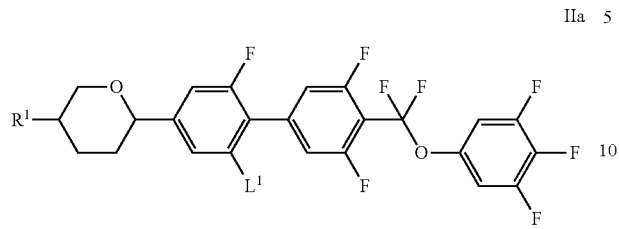

in which R¹ and L¹ are as defined for formula II.

Preferred compounds of the formula III are those of the formula IIIa or IIIb:

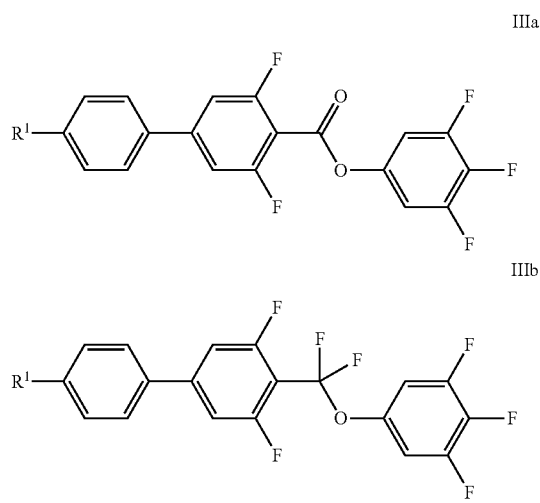

in which R¹ is as defined for formula III.

The liquid-crystalline media may in addition comprise further additives, such as stabilisers, chiral dopants and nanoparticles. The individual, added compounds are preferably employed in concentrations of 0.1 to 6%. The concentrations of the individual compounds used are preferably in each case in the range from 0.1% to 3%. However, the concentration data for the other constituents of the liquid-crystal mixtures, i.e. the liquid-crystalline or mesogenic compounds and, where used, the polymerisation components, are indicated without taking into account the concentration of these additives.

The liquid-crystalline media preferably comprise 0.01 to 10% by weight of an optically active, chiral dopant. This supports the formation of a liquid-crystalline blue phase. For blue phases, preference is given to the use of chiral dopants having a high HTP ('helical twisting power'), typically in the range from 2-5% by weight.

The LC media which can be used in accordance with the invention are prepared in a manner customary per se, for example by mixing one or more of the above-mentioned compounds with one or more polymerisable compounds as defined above and optionally with further liquid-crystalline compounds and/or additives. In general, the desired amount of the components used in smaller amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing. The invention furthermore relates to the process for the preparation of the LC media according to the invention.

For the purposes of the present invention, the terms alkyl, alkenyl, etc., are defined as follows:

The term "alkyl" encompasses straight-chain and branched alkyl groups having 1-9 carbon atoms, in particular the straight-chain groups methyl, ethyl, propyl, butyl, pentyl, hexyl and heptyl. Groups having 2-5 carbon atoms are generally preferred.

The term "alkenyl" encompasses straight-chain and branched alkenyl groups having up to 9 carbon atoms, in particular the straight-chain groups. Particularly preferred alkenyl groups are $C_2$-$C_7$-1E-alkenyl, $C_4$-$C_7$-3E-alkenyl, $C_5$-$C_7$-4-alkenyl, $C_6$-$C_7$-5-alkenyl and $C_7$-6-alkenyl, in particular $C_2$-$C_7$-1E-alkenyl, $C_4$-$C_7$-3E-alkenyl and $C_5$-$C_7$-4-alkenyl. Examples of preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" in this application encompasses straight-chain groups containing at least one fluorine atom, preferably a terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "halogenated alkyl radical" preferably encompasses mono- or polyfluorinated and/or -chlorinated radicals. Perhalogenated radicals are included. Particular preference is given to fluorinated alkyl radicals, in particular $CF_3$, $CH_2CF_3$, $CH_2CHF_2$, $CHF_2$, $CH_2F$, $CHFCF_3$ and $CF_2CHFCF_3$.

The term "alkylene" encompasses straight-chain and branched alkanediyl groups having 1-12 carbon atoms, in particular the straight-chain groups methylene, ethylene, propylene, butylene and pentylene. Groups having 2-8 carbon atoms are generally preferred.

Further combinations of the embodiments and variants of the invention in accordance with the description also arise from the claims.

EXAMPLES

Substance Examples

Example 1

Tris[2-(2-methylacryloyloxy)ethyl]cyclohexane-1,3,5-tricarboxylate

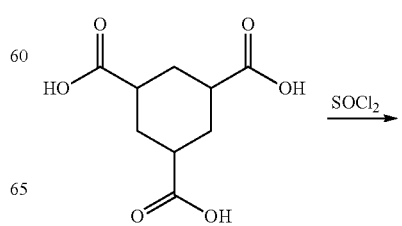

-continued

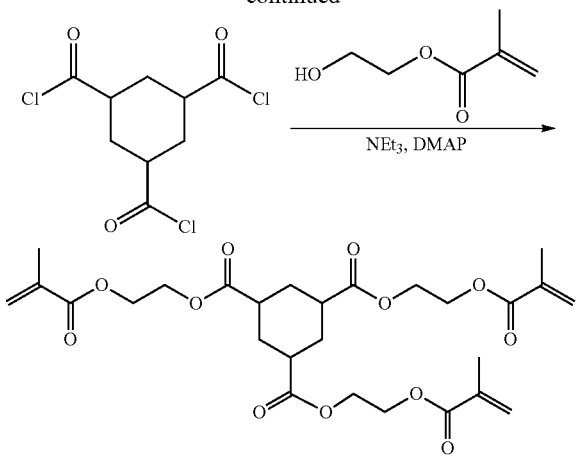

5.0 g (23.2 mmol) of cyclohexane-1,3,5-tricarboxylic acid are heated at 90° C. for 3 h together with 7.6 ml (0.1 mol) of thionyl chloride and 0.1 ml of DMF. The mixture is taken up in toluene and evaporated to dryness in vacuo. The cyclohexane-1,3,5-tricarbonyl chloride obtained in this way is used further directly.

15.8 g (0.12 mol) of 2-hydroxyethyl methacrylate are initially introduced in 50 ml of dichloromethane together with 50 ml (0.36 mol) of triethylamine and 123 mg (1.0 mmol) of DMAP. 5.5 g (20.3 mol) of crude cyclohexane-1,3,5-tricarbonyl chloride dissolved in 100 ml of dichloromethane are slowly added with ice-cooling. When the addition is complete, the mixture is stirred at room temperature for 20 h. The batch is filtered and washed with water. The solution is dried using sodium sulfate and evaporated to dryness. The crude product is purified by column chromatography (SiO$_2$, CH$_2$Cl$_2$: MTBE=95:5→90:10), giving tris[2-(2-methylacryloyloxy)ethyl]cyclohexane-1,3,5-tricarboxylate in excellent purity (>99%) as a colourless oil.

Phase sequence: Tg −46 I $^1$H-NMR (400 MHz, CHCl$_3$): δ=6.12-6.11 (m, 3H, H$_{acrylate}$), 5.61-5.58 (m, 3H, H$_{acrylate}$), 4.35 (s, 12H, —OCH$_2$CH$_2$—OC(O)), 2.48-2.39 (m, 3H, H$_{aliphat.}$), 2.31-2.24 (m, 3H, H$_{aliphat.}$), 1.95-1.94 (m, 9H, Me$_{acrylate}$), 1.55 (q, 3H, J=12.7 Hz, H$_{aliphat.}$).

MS (EI): m/e (%)=552 (3, M$^+$), 113 (100).

Example 2

Tris[2-(2-methylacryloyloxy)ethyl]cyclohexane-1,2,4-tricarboxylate

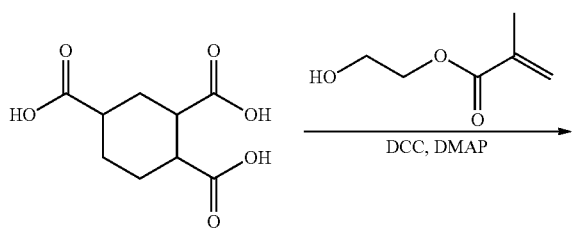

-continued

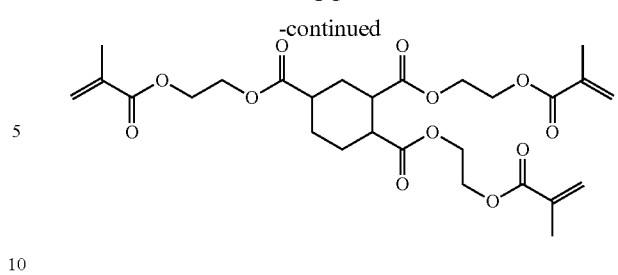

283 mg (2.3 mmol) of DMAP are initially introduced in 230 ml of THF, and 1.2 ml (1.2 mmol) of hydrogen chloride solution (1 M solution in Et$_2$O) are added. 10.0 g (46.3 mmol) of cyclohexane-1,3,5-tricarboxylic acid and 25.3 ml (0.21 mol) of 2-hydroxyethyl methacrylate are added, and 210 ml (0.21 mol) of DCC (1 M solution in CH$_2$Cl$_2$) are added to the mixture. The mixture is stirred for 22 h, and 17.5 g (0.14 mol) of oxalic acid dihydrate are added in portions. The batch is filtered, and the filtrate is evaporated to dryness. The crude product is purified by chromatography (SiO$_2$, pentane:ethyl acetate=4:1), giving tris[2-(2-methylacryloyloxy)ethyl]cyclohexane-1,3,5-tricarboxylate as a colourless oil.

Phase sequence: Tg −42 I $^1$H-NMR (400 MHz, CHCl$_3$): δ=6.13-6.11 (m, 3H, H$_{acrylate}$), 5.61-5.58 (m, 3H, H$_{acrylate}$), 4.41-4.23 (m, 12H, —OCH$_2$CH$_2$—OC(O)), 3.30-3.26 (m 1H, H$_{aliphat.}$), 2.56-2.48 (m, 1H, H$_{aliphat.}$), 2.41-2.30 (m, 3H, H$_{aliphat.}$), 2.11-1.77 (m, 11H, H$_{aliphat.}$), 1.67-1.56 (m, 1H, H$_{aliphat.}$), 1.47-1.35 (m, 1H, H$_{aliphat.}$).

MS (EI): m/e (%)=552 (3, M$^+$), 113 (100).

Example 3

Tris[2-(2-methylacryloyloxy)ethyl]benzene-1,3,5-tricarboxylate

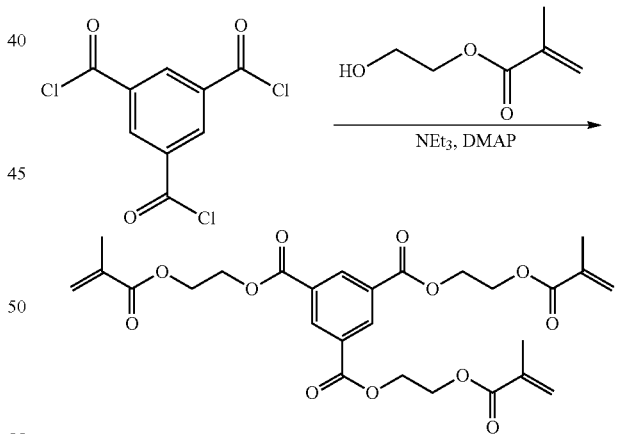

The purification is carried out by recrystallisation from isopropanol, giving tris[2-(2-methylacryloyloxy)ethyl]benzene-1,3,5-tricarboxylate as a colourless solid having an m.p. of 79° C.

Phase sequence: C 79 I $^1$H-NMR (300 MHz, CHCl$_3$): δ=8.87 (s, 3H, H$_{arom.}$), 6.15-6.14 (m, 3H, H$_{acrylate}$), 5.61-5.59 (m, 3H, H$_{acrylate}$), 4.66-4.63 (m, 6H, —OCH$_2$CH$_2$—OC(O)), 4.53-4.50 (m, 6H, —OCH$_2$CH$_2$—OC(O)), 1.95 (dd, 9H, J=0.9 Hz, J=1.0 Hz, H$_{Me}$).

MS (EI): m/e (%)=546 (23, M$^+$), 417 (95), 113 (100).

Example 4

Tris(2-acryloyloxyethyl)benzene-1,3,5-tricarboxylate

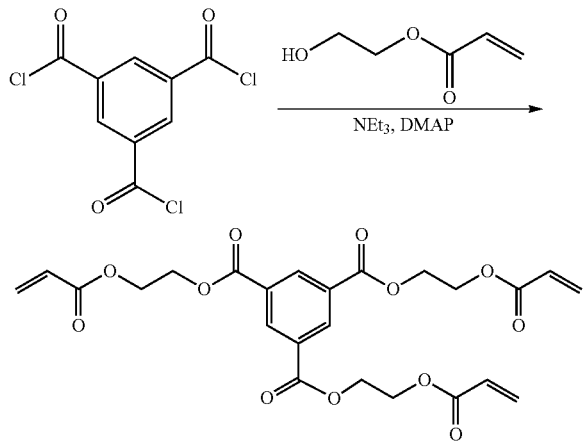

The purification is carried out by column chromatography (SiO$_2$, pentane:ethyl acetate), giving tris(2-acryloyloxyethyl)benzene-1,3,5-tricarboxylate as a colourless oil.

Phase sequence: Tg –37 I $^1$H-NMR (300 MHz, CHCl$_3$): δ=8.87 (s, 3H, H$_{arom.}$), 6.46 (dd, 3H, J=17.3 Hz, J=1.5 Hz, H$_{acrylate}$), 6.16 (dd, 6H, J=17.3 Hz, J=10.5 Hz, H$_{acrylate}$), 5.88 (dd, 6H, J=10.5 Hz, J=1.5 Hz, H$_{acrylate}$), 4.66-4.61 (m, 3H, —OCH$_2$CH$_2$—OC(O)), 4.56-4.52 (m, 3H, —OCH$_2$CH$_2$—OC(O)).

MS (EI): m/e (%)=504 (1, M$^+$), 389 (100).

Example 5

Tetrakis[2-(2-methylacryloyloxy)ethyl]benzene-1,2,4,5-tetracarboxylate

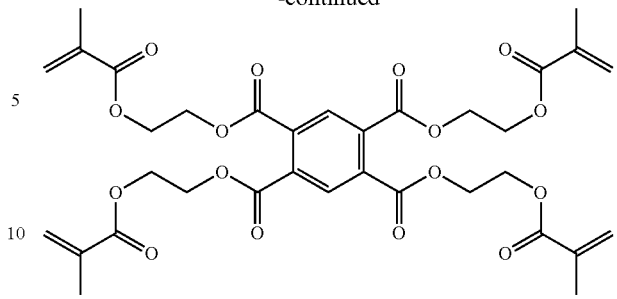

The purification is carried out by column chromatography, giving tetrakis-[2-(2-methylacryloyloxy)ethyl]benzene-1,2,4,5-tetracarboxylate as a colourless oil.

Phase sequence: Tg –32 I $^1$H-NMR (400 MHz, CHCl$_3$): δ=8.09 (s, 2H, H$_{arom.}$), 6.15-6.13 (m, 4H, H$_{acrylate}$)) 5.61-5.59 (m, 4H, H$_{acrylate}$), 4.60-4.57 (m, 8H, —OCH$_2$CH$_2$—OC(O)), 4.48-4.44 (m, 8H, —OCH$_2$CH$_2$—OC(O)), 1.95 (dd, 12H, J=0.9 Hz, J=1.0 Hz, H$_{Me}$).

MS (EI): m/e (%)=702 (4, M$^+$), 572 (2), 113 (100).

Example 6

3,5-Bis[5-(2-methacryloyloxy)valeryl]phenyl 5-(2-methacryloyloxy)valerate is prepared as described below

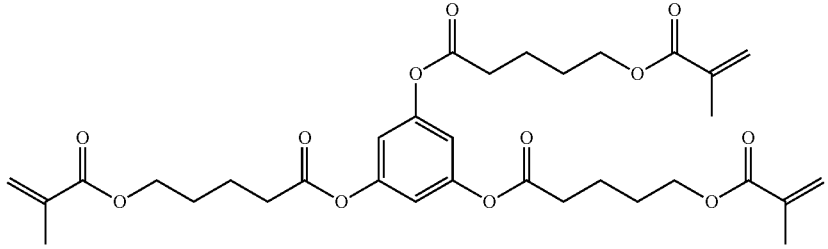 [SMILES: C=C(C)C(=O)OCCCCC(=O)Oc1cc(OC(=O)CCCCOC(=O)C(=C)C)cc(OC(=O)CCCCOC(=O)C(=C)C)c1]

The compound 3,5-bis[5-(2-methacryloyloxy)valeryl]phenyl 5-(2-methacryloyloxy)valerate according to the invention is prepared as described below.

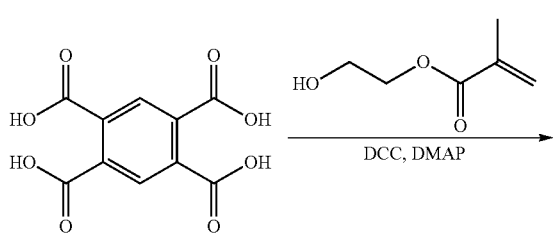

8.0 g (63.4 mmol) of phloroglucine are initially introduced in 1000 ml of THF together with 45.9 g (0.25 mol) of 5-bromovaleric acid and 0.50 g (4.1 mmol) of DMAP. 254 ml (0.24 mol) of DCC (1 M solution in toluene) are metered in, and the mixture is stirred at room temperature for 18 h. 16 g (0.13 mol) of oxalic acid dihydrate are added, and, after 1 h, the insoluble material is filtered off. The filtrate is evaporated to dryness, and the residue is purified by column chromatography (SiO$_2$, toluene→toluene:ethyl acetate=95:5), giving 3,5-bis(5-bromopentanoyloxy)-phenyl 5-bromovalerate as a yellowish oil.

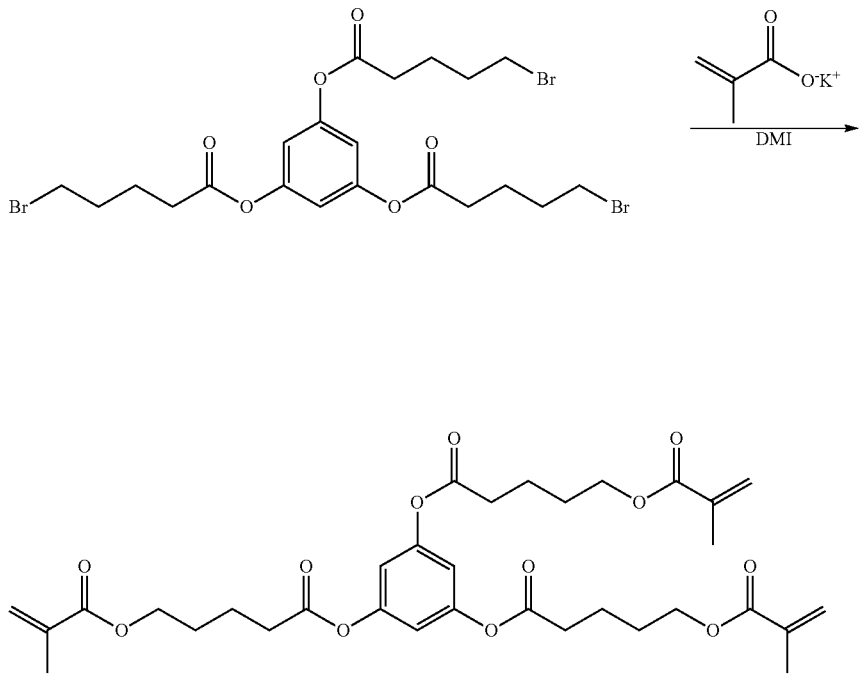

11.7 g (19.0 mmol) of 3,5-bis(5-bromopentanoyloxy)phenyl 5-bromovalerate are stirred at 40° C. for 16 h together with 47.3 g (0.38 mol) of potassium methacrylate and 200 mg of BHT in 350 ml of DMI. The batch is diluted with ethyl acetate, and the mixture is washed with water and saturated sodium chloride solution. The solution is dried using sodium sulfate and evaporated to dryness. The crude product is purified by column chromatography (SiO$_2$, toluene:ethyl acetate=9:1), giving 3,5-bis[5-(2-methacryloyloxy)valeryl] phenyl 5-(2-methacryloyloxy)valerate as a colourless solid of m.p. 24° C.

Phase sequence: Tg –57 C 24 I

Mixture Examples

The following acronyms are used in order to describe the components of the liquid-crystalline base mixture (host). The index n adopts a value from 1 to 9. The compounds are suitable for the preparation of liquid-crystalline media and displays according to the invention.

TABLE A

Acronyms for LC components

AUUQU-n-F

TABLE A-continued
Acronyms for LC components
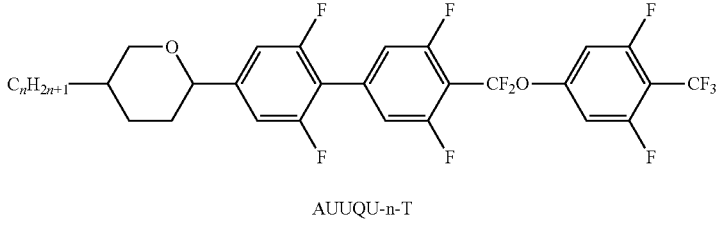
AUUQU-n-T
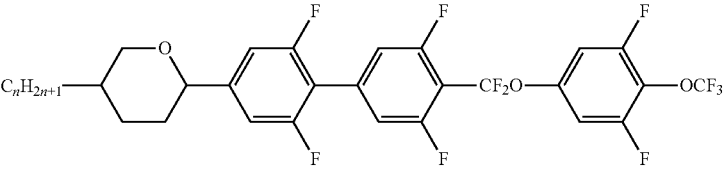
AUUQU-n-OT
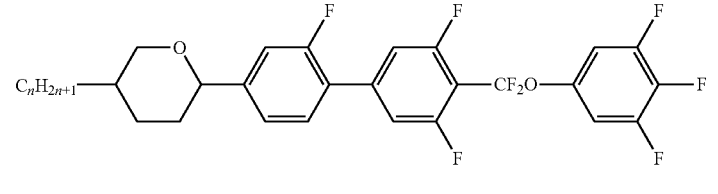
AGUQU-n-F
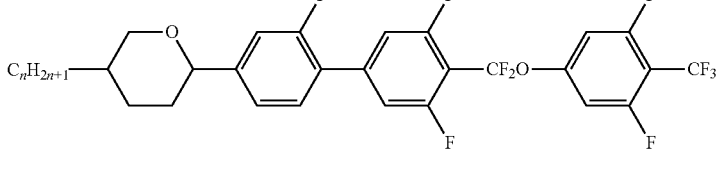
AGUQU-n-T
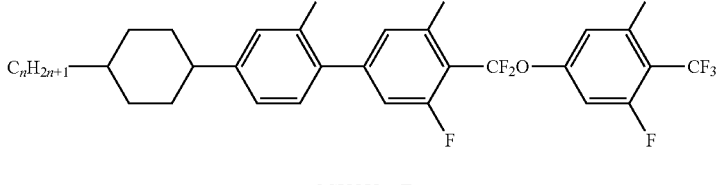
CGUQU-n-T
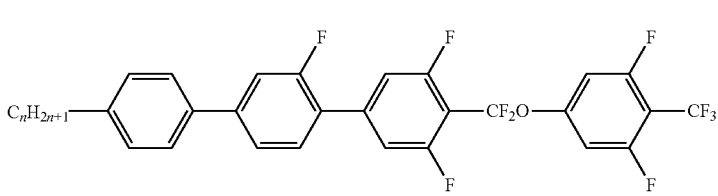
PGUQU-n-T

TABLE A-continued
Acronyms for LC components
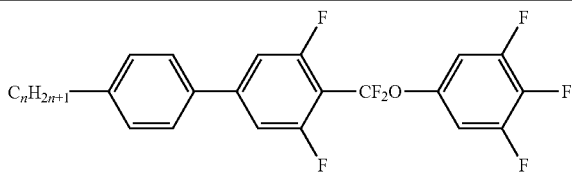
PUQU-n-F
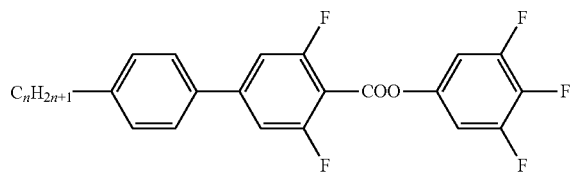
PUZU-n-F
The following monomers are preferably used:
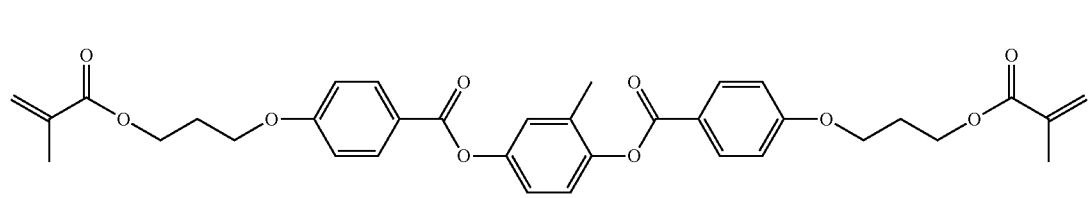
RM220
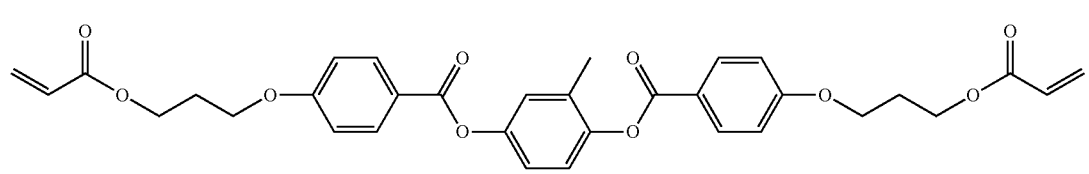
RM257
RM220 has the phase sequence C 82.5 N 97 I.
RM257 has the phase sequence C 66 N 127 I.
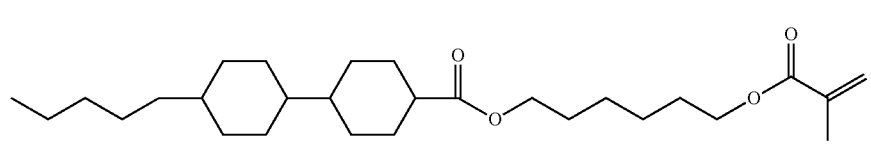
RM-1
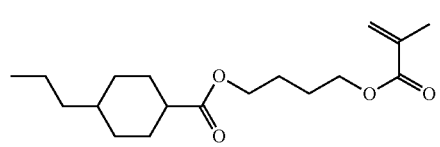
RM-2
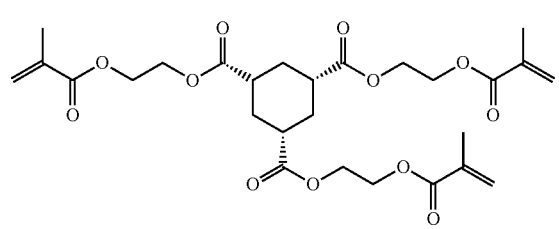
RM-3

-continued

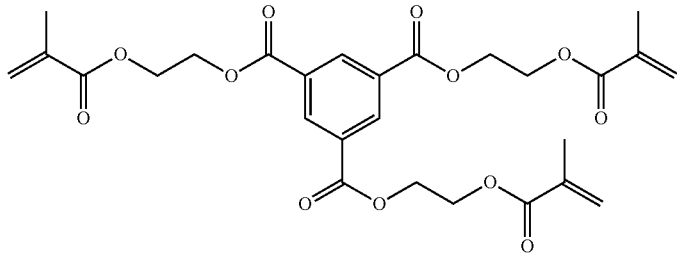
RM-4

The following additives are preferably used (DP: chiral dopant, IN: polymerisation initiator):

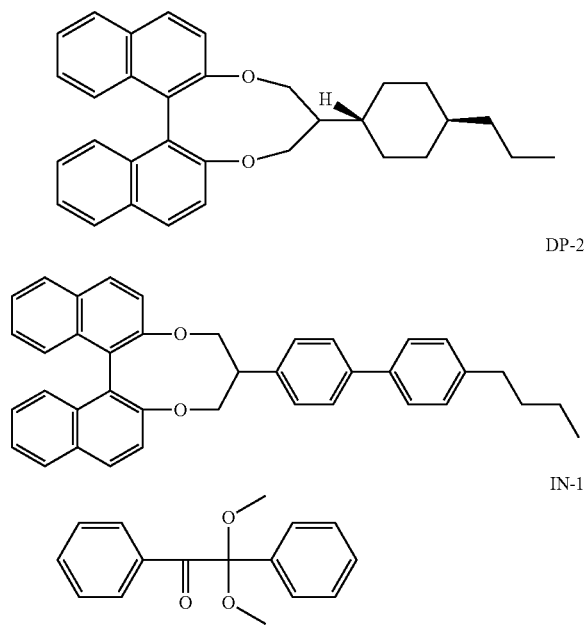

DP-1

DP-2

IN-1
(Ciba ® Irgacure ® 651)

Further chiral dopants and polymerisation initiators for LC mixtures are known to the person skilled in the art and are expressly mentioned here.

The media are characterised as described before the polymerisation. The RM components are then polymerised in the blue phase by irradiation once (180 s), and the resultant media are re-characterised.

Description of the Polymerisation

Before the polymerisation of a sample, the phase properties of the medium are established in a test cell having a thickness of about 10 microns and an area of 2×2.5 cm. The filling is carried out by capillary action at a temperature of 75° C. The measurement is carried out under a polarising microscope with heating stage with a temperature change of 1° C./min.

The polymerisation of the media is carried out by irradiation with a UV lamp (Hönle, Bluepoint 2.1, 365 nm interference filter) having an effective power of about 1.5 mW/cm² for 180 seconds. The polymerisation is carried out directly in the electro-optical test cell. The polymerisation is carried out initially at a temperature at which the medium is in the blue phase I (BP-I). The polymerisation is carried out in a plurality of part-steps, which gradually result in complete polymerisation. The temperature range of the blue phase generally changes during the polymerisation. The temperature is therefore adapted between each part-step so that the medium is still in the blue phase. In practice, this can be carried out by observing the sample under the polarising microscope after each irradiation operation of about 5 s or longer. If the sample becomes darker, this indicates a transition into the isotropic phase. The temperature for the next part-step is reduced correspondingly. The entire irradiation time which results in maximum stabilisation is typically 180 s at the irradiation power indicated. Further polymerisations can be carried out in accordance with an optimised irradiation/temperature programme.

Alternatively, the polymerisation can also be carried out in a single irradiation step, in particular if a broad blue phase is already present before the polymerisation.

Electro-Optical Characterisation

After the above-described polymerisation and stabilisation of the blue phase, the phase width of the blue phase is determined. The electro-optical characterisation is carried out subsequently at various temperatures within and if desired also outside this range.

The test cells used are fitted on one side with interdigital electrodes on the cell surface. The cell gap, the electrode separation and the electrode width are typically each 1 to 10 microns and are preferably of the same size. This uniform dimension is referred to below as the gap width. The area covered by electrodes is about 0.4 cm². The test cells do not have an alignment layer. For the electro-optical characterisation, the cell is located between crossed polarising filters, where the longitudinal direction of the electrodes adopts an angle of 45° to the axes of the polarising filter. The measurement is carried out using a DMS301 (Autronic-Melchers) at right angles to the cell plane, or by means of a highly sensitive camera on the polarising microscope. In the voltage-free state, the arrangement described gives an essentially dark image (definition 0% transmission).

Firstly, the characteristic operating voltages and then the response times are measured on the test cell. The operating voltage is applied to the cell electrodes in the form of rectangular voltage having an alternating sign (frequency 100 Hz) and variable amplitude, as described below.

The transmission in the voltage-free state is defined as 0%. The transmission is measured while the operating voltage is increased. The attainment of the maximum value of the transmission defines the characteristic quantity of the operating voltage $V_{100}$. Equally, the characteristic voltage $V_{10}$ is determined at 10% of the maximum transmission. These values are optionally measured at various temperatures in the range of the blue phase, in any case at room temperature (20° C.).

Relatively high characteristic operating voltages $V_{100}$ are observed at the upper and lower end of the temperature range of the blue phase. In the region of the minimum operating voltage, $V_{100}$ generally only increases slowly with temperature. This temperature range, limited by $T_1$ and $T_2$, is referred to as the usable, flat temperature range (FR). The width of this "flat range" (FR) is $(T_2-T_1)$ and is known as the width of the flat range (WFR). The precise values of $T_1$ and $T_2$ are determined by the intersections of tangents on the flat curve section FR and the adjacent steep curve sections in the $V_{100}$/temperature diagram.

In the second part of the measurement, the response times during switching on and off ($\tau_{on}$, $\tau_{off}$) are determined. The response time $\tau_{on}$ is defined by the time to achievement of 90% intensity after application of a voltage at the level of $V_{100}$ at the selected temperature. The response time $\tau_{off}$ is defined by the time until the decrease by 90% starting from maximum intensity at $V_{100}$ after reduction of the voltage to 0 V. The response time is also determined at various temperatures in the range of the blue phase.

As further characterisation, the transmission at continuously increasing and falling operating voltage between 0 V and $V_{100}$ is measured at a temperature within the FR. The difference between the two curves is known as hysteresis. The difference in the transmissions at $0.5 \cdot V_{100}$ and the difference in the voltages at 50% transmission are, for example, characteristic hysteresis values and are known as $\Delta T_{50}$ and $\Delta V_{50}$ respectively.

As a further characteristic quantity, the ratio of the transmission in the voltage-free state before and after passing through a switching cycle can be measured. This transmission ratio is referred to as the "memory effect". The value of the memory effect is 1.0 in the ideal state. Values above 1 mean that a certain memory effect is present in the form of excessively high residual transmission after the cell has been switched on and off. This value is also determined in the working range of the blue phase (FR).

The measurement values are determined, unless indicated otherwise, at 20° C.

Mixture Examples

| Host mixture H1 | |
|---|---|
| Component | % by wt. |
| PUQU-3-F | 5.00 |
| AGUQU-3-F | 13.00 |
| AUUQU-2-F | 6.00 |
| AUUQU-3-F | 10.00 |
| AUUQU-4-F | 6.00 |
| AUUQU-5-F | 9.00 |
| AUUQU-7-F | 6.00 |
| AUUQU-3-T | 8.00 |
| AUUQU-3-OT | 12.00 |
| PUZU-2-F | 6.00 |
| PUZU-3-F | 10.00 |
| PUZU-5-F | 9.00 |
| Σ | 100.00 |

Clearing point: 71° C.,
Δε · Δn: 39.5.

Mixture Examples M1 and M2

The following polymerisable media are mixed:

| Component | M1 (for comparison) Proportion [% by wt.] | M2 Proportion [% by wt.] |
|---|---|---|
| Host mixture H1 | 86.3 | 86.3 |
| DP-1 | 2.5 | 2.5 |
| IN-1 | 0.2 | 0.2 |
| RM-257 | 6 | — |
| RM-1 | — | 8 |
| RM-2 | 5 | — |
| RM-3 | — | 3 |

The media are characterised as described before the polymerisation. The RM components are then polymerised in the blue phase at the lower end of the temperature range thereof by irradiation once (180 s), and the resultant media are re-characterised.

The polymer-stabilised liquid-crystalline media exhibit a blue phase over a broad temperature range.

| Measurement values of use examples | M1 | M2 |
|---|---|---|
| Nematic-blue phase transition before the polymerisation | 38° C. | 31° C. |
| Temperature range of the blue phase | −6° C.-53° C. | −5° C.-53° C. |
| $V_{10}$ (20° C.) | 25.2 V | 11.4 V |
| $V_{100}$ (20° C.) | 58.6 V | 37.7 V |
| $\Delta V_{50}$ (20° C.) | 6.8 V | 0.9 V |
| Gap width | 10 μm | 10 μm |

The polymer-stabilised medium M2 exhibits a significant reduction in the hysteresis ($\Delta V_{50}$) and the operating voltage compared with the polymer-stabilised medium M1 (comparative experiment).

The invention claimed is:
1. Liquid-crystalline medium, characterised in that it comprises one or more compounds of the formula I

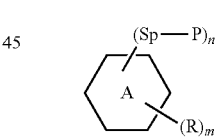

I in which
R denotes
  a) in each case, independently of one another, a halogenated or unsubstituted alkyl radical having 1 to 15 C atoms, where, in addition, one or more $CH_2$ groups in these radicals may each be replaced, independently of one another, by —C≡C—, —CH═CH—, —(CO)O—, —O(CO)—, —(CO)— or —O— in such a way that O atoms are not linked directly to one another,
  b) a group -Sp-P, or
  c) F, Cl, H, Br, CN, SCN, NCS or $SF_5$,
A denotes
  a) cyclohexane or cyclohexene, in which, in addition, one or more non-adjacent $CH_2$ groups may be replaced by —O— and/or —S—,
  b) benzene, in which one or two CH groups may be replaced by N, or c) a radical from the group bicyclo[1.1.1]pentane, bicyclo[2.2.2]-octane, spiro[3.3]heptane, selenophene, thiophene, furan, naphthalene, anthracene, phenanthrene, chroman, adamantane,

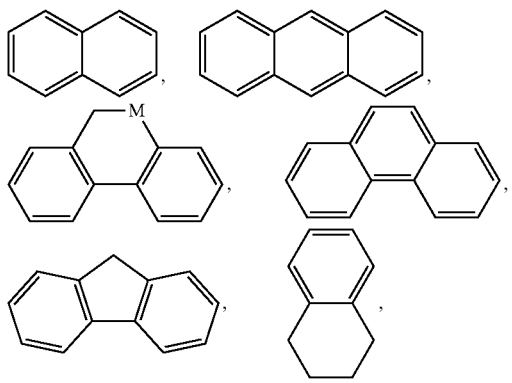

in which
one or more double bonds may be replaced by single bonds, and one or more CH groups may be replaced by N,
and wherein M denotes —O—, —S—, —CH$_2$—, —CHY— or —CYY$^1$—, and Y and Y$^1$ denote Cl, F, CN, OCF$_3$ or CF$_3$,
m denotes 0, 1, 2 or 3, or more when A is a polycyclic ring,
n denotes 3 or more,
P denotes a polymerisable group,
Sp denotes a spacer group of the formula Sp'-X, where
Sp' denotes alkylene having 1 to 24 C atoms, which is optionally mono- or polysubstituted by F, Cl, Br, I or CN and in which, in addition, one or more non-adjacent CH$_2$ groups may each be replaced, independently of one another, by —O—, —S—, —NH—, —NR$^{00}$—, —SiR$^{00}$R$^{000}$—, —CO—, —COO—, —OCO—, —OCO—O—, —S—CO—, —CO—S—, —NR$^{00}$—CO—O—, —O—CO—NR$^{00}$—, —NR$^{00}$—CO—NR$^{00}$—, —CH=CH— or —C≡C— in such a way that O and/or S atoms are not linked directly to one another, and
X denotes —O—, —S—, —CO—, —COO—, —OCO—, —O—COO—, —CO—NR$^{00}$—, —NR$^{00}$—CO—, —NR$^{00}$—CO—NR$^{00}$—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH=N—, —N=CH—, —N=N—, —CH=CR$^{00}$—, —CY$^2$=CY$^3$—, —C≡C—, —CH=CH—COO—, —OCO—CH=CH— or a single bond, wherein
R$^{00}$ and R$^{000}$ each, independently of one another, denote H or alkyl having 1 to 12 C atoms, and
Y$^2$ and Y$^3$ each, independently of one another, denote H, F, Cl or CN,
or a polymer comprising one or more polymerised compounds of the formula I, and
wherein the liquid-crystalline medium has a blue phase at at least one temperature.

2. Liquid-crystalline medium according to claim 1, characterised in that the ring A in formula I denotes cyclohexane or benzene.

3. Liquid-crystalline medium according to claim 1, characterised in that, in formula I, P denotes a radical of the formula CH$_2$=CW$^1$—COO—, in which W$^1$ is H, F, Cl, CN, CF$_3$, phenyl or alkyl having 1 to 5 C atoms.

4. Liquid-crystalline medium according to claim 1, characterised in that the number of polymerisable groups, "n", in formula I is 3, 4 or 5.

5. Liquid-crystalline medium according to claim 1, characterised in that it has a blue phase at least in the range from 20 to 25° C. after stabilisation of the blue phase by polymerisation.

6. Liquid-crystalline medium according to claim 1, characterised in that it comprises one or more further compounds selected from the formulae II and III:

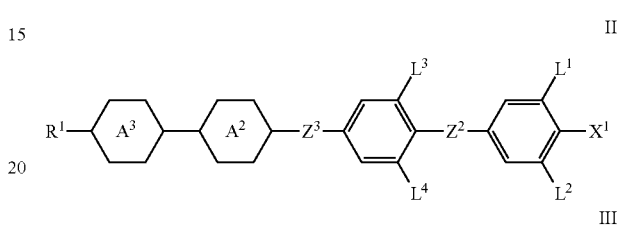

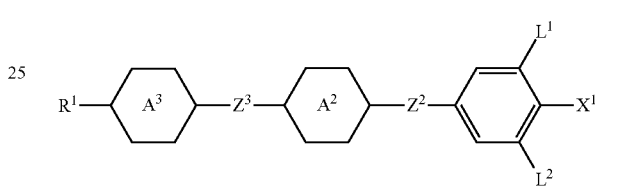

in which
R$^1$ in each case, independently of one another, denotes an unsubstituted alkyl radical having 1 to 15 C atoms, where, in addition, one or more CH$_2$ groups in this radical may each be replaced, independently of one another, by —C≡C—, —CH=CH—, —CF=CF—, —CF=CH—, —CH=CF—, —(CO)O—, —O(CO)—, —(CO)— or —O— in such a way that O atoms are not linked directly to one another,
A$^2$ and A$^3$, independently of one another, denote

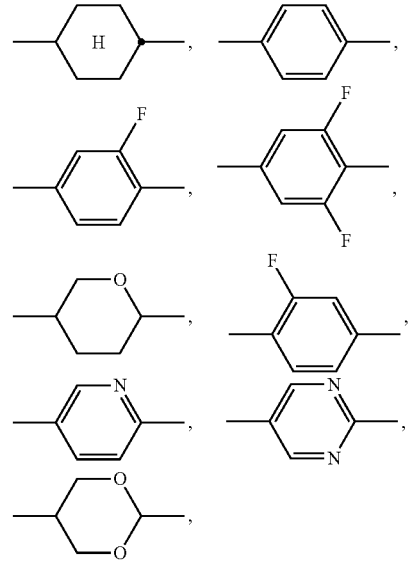

Z$^2$ and Z$^3$, independently of one another, denote a single bond, CF$_2$O, CH$_2$CH$_2$, CF$_2$CH$_2$, CF$_2$CF$_2$, CFHCFH, CFHCH$_2$, (CO)O, CH$_2$O, C≡C, CH=CH, CF=CH, CF=CF, where asymmetrical connecting members may be oriented in both possible directions, X$^1$ denotes F, Cl, CN, or
  alkyl, alkenyl, alkenyloxy, alkylalkoxy or alkoxy having 1 to 3 C atoms, which is mono- or polysubstituted by F, and
L$^1$ to L$^4$ denote H or F.

7. A method of using the compounds of the formula I

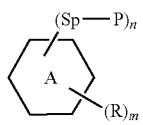

I in which
R denotes
  a) in each case, independently of one another, a halogenated or unsubstituted alkyl radical having 1 to 15 C atoms, where, in addition, one or more CH$_2$ groups in these radicals may each be replaced, independently of one another, by —C≡C—, —CH=CH—, —(CO)O—, —O(CO)—, —(CO)— or —O— in such a way that O atoms are not linked directly to one another,
  b) a group -Sp-P, or
  c) F, Cl, H, Br, CN, SCN, NCS or SF$_5$,
A denotes
  a) cyclohexane or cyclohexene, in which, in addition, one or more non-adjacent CH$_2$ groups may be replaced by —O— and/or —S—,
  b) benzene, in which one or two CH groups may be replaced by N,
  or
  c) a radical from the group bicyclo[1.1.1]pentane, bicyclo[2.2.2]-octane, spiro[3.3]heptane, dioxane, selenophene, thiophene, furan, naphthalene, anthracene, phenanthrene, chroman, adamantane,

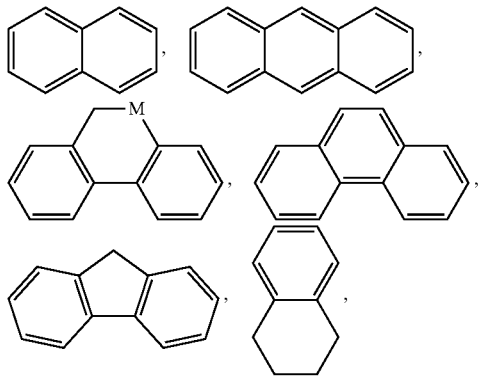

in which
one or more double bonds may be replaced by single bonds, and
one or more CH groups may be replaced by N, and wherein M denotes —O—, —S—, —CH$_2$—, —CHY— or —CYY$^1$—,
and Y and Y$^1$ denote Cl, F, CN, OCF$_3$ or CF$_3$,
m denotes 0, 1, 2 or 3, for polycyclic rings A also more or more when A is a polycyclic ring,
n denotes 3 or more,
P denotes a polymerisable group,
Sp denotes a spacer group of the formula Sp'-X, where
Sp' denotes alkylene having 1 to 24 C atoms, which is optionally mono- or polysubstituted by F, Cl, Br, I or CN and in which, in addition, one or more non-adjacent CH$_2$ groups may each be replaced, independently of one another, by —O—, —S—, —NH—, —NR$^{00}$—, —SiR$^{00}$R$^{000}$—, —CO—, —COO—, —OCO—, —OCO—O—, —S—CO—, —CO—S—, —NR$^{00}$—CO—O—, —O—CO—NR$^{00}$—, —NR$^{00}$—CO—NR$^{00}$—, —CH=CH— or —C≡C— in such a way that O and/or S atoms are not linked directly to one another, and X denotes —O—, —S—, —CO—, —COO—, —OCO—, —O—COO—, —CO—NR$^{00}$—, —NR$^{00}$—CO—, —NR$^{00}$—CO—NR$^{00}$—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH=N—, —N=CH—, —N=N—, —CH=CR$^{00}$—, —CY$^2$=CY$^3$—, —C≡C—, —CH=CH—COO—, —OCO—CH=CH— or a single bond, wherein
R$^{00}$ and R$^{000}$ each, independently of one another, denote H or alkyl having 1 to 12 C atoms, and
Y$^2$ and Y$^3$ each, independently of one another, denote H, F, Cl or CN,
or of a polymer comprising one or more polymerised compounds of the formula I, in liquid-crystal (LC) displays having a blue phase,
  said method comprising introducing a compound of formula I or a polymer thereof in a liquid-crystal (LC) display having a blue phase.

8. Process for the preparation of an LC medium, characterised in that one or more liquid-crystalline compounds are mixed with one or more polymerisable compounds of the formula I according to claim 1 and optionally with additives and optionally polymerised.

9. Electro-optical liquid-crystal display which operates in a polymer-stabilised blue phase or is of the PS/PSA type, characterised in that it contains a compound of the formula I or a polymer comprising one or more polymerised compounds of the formula I according to claim 1.

10. Process for the production of an electro-optical device containing a liquid-crystalline polymer-stabilised medium, characterised in that a liquid-crystalline medium comprising one or more compounds of the formula I according to claim 1 is polymerised in the electro-optical device.

11. A method of using the liquid-crystalline medium according to claim 1 for an electro-optical device, said method comprising introducing said liquid crystal medium in an electro-optical device.

12. Liquid-crystalline medium according to claim 1, characterised in that "m" in formula I is 0, 1, 2 or 3.

* * * * *